(12) United States Patent
Tolomei et al.

(10) Patent No.: US 8,724,140 B2
(45) Date of Patent: May 13, 2014

(54) PRINT STREAM PROCESSING MODULE OPTIMIZER FOR DOCUMENT PROCESSING

(75) Inventors: Victor Tolomei, Raleigh, NC (US); Michael J. McIntee, El Dorado Hills, CA (US); Uwe Meister, Elk Grove, CA (US)

(73) Assignee: Bell and Howell, LLC, Durham, NC (US)

( * ) Notice: Subject to any disclaimer, the term of this patent is extended or adjusted under 35 U.S.C. 154(b) by 969 days.

(21) Appl. No.: 12/432,198

(22) Filed: Apr. 29, 2009

(65) Prior Publication Data

US 2009/0268250 A1    Oct. 29, 2009

Related U.S. Application Data

(63) Continuation of application No. 11/217,458, filed on Sep. 2, 2005, now Pat. No. 8,218,170.

(60) Provisional application No. 60/616,625, filed on Oct. 8, 2004.

(51) Int. Cl.
*G06F 3/12* (2006.01)

(52) U.S. Cl.
USPC ......... 358/1.15; 358/1.13; 358/1.2; 358/1.18; 358/1.9; 705/408; 705/401; 705/406

(58) Field of Classification Search
USPC ....................................................... 358/1.15
See application file for complete search history.

(56) References Cited

U.S. PATENT DOCUMENTS

| | | | |
|---|---|---|---|
| 5,528,734 A | 6/1996 | Sanchez | |
| 5,644,682 A | 7/1997 | Weinberger et al. | |
| 5,669,040 A | 9/1997 | Hisatake | |
| 5,684,706 A | 11/1997 | Harman et al. | |
| 6,195,174 B1 * | 2/2001 | Johnson et al. | 358/1.18 |
| 6,481,711 B1 | 11/2002 | Pickett | |
| 6,493,098 B1 | 12/2002 | Cornell | |
| 6,624,908 B1 | 9/2003 | Petchenkine et al. | |

(Continued)

FOREIGN PATENT DOCUMENTS

GB    2 368 954 A    5/2002

OTHER PUBLICATIONS

United States Office Action issued in U.S. Appl. No. 11/217,458, mailed Nov. 5, 2009.

(Continued)

*Primary Examiner* — Huo Long Chen
(74) *Attorney, Agent, or Firm* — McDermott Will & Emery LLP

(57) ABSTRACT

One or more print streams destined for one or more print stream processing modules are optimized prior to printing, based on relevant document attributes. Optimization may balance operation time of a first processing module with that of a second processing module, by appropriate assigning of documents to the print streams. Optimization may separate input print file document pages into sort groups and/or order sort group documents from largest to smallest. Optimization may allocate documents to optimize the inserter throughput without damaging the integrity of the sort groups. With 2-up or 3-up printing or the like, allocation of sort groups between the multiple outputs to be created after printed paper is split may ensure that parallel paper document outputs are as nearly the same length as possible, to minimize paper wastage. Separation of pages of the same document among different streams/modules can be avoided.

24 Claims, 11 Drawing Sheets

(56) References Cited

U.S. PATENT DOCUMENTS

| | | | |
|---|---|---|---|
| 6,707,574 | B1 | 3/2004 | Freeman et al. |
| 6,970,261 | B1 * | 11/2005 | Robles .................. 358/1.15 |
| 7,206,087 | B2 | 4/2007 | Ryan et al. |
| 2002/0097407 | A1 | 7/2002 | Ryan et al. |
| 2002/0129081 | A1 | 9/2002 | Rai et al. |
| 2002/0186384 | A1 | 12/2002 | Winston et al. |
| 2003/0007818 | A1 * | 1/2003 | Kato ........................ 400/61 |
| 2003/0084068 | A1 * | 5/2003 | Harman .................... 707/200 |
| 2003/0218775 | A1 | 11/2003 | Udo et al. |
| 2004/0036902 | A1 | 2/2004 | Ducato |
| 2004/0051912 | A1 * | 3/2004 | Schlank et al. ............ 358/468 |
| 2004/0114170 | A1 | 6/2004 | Christiansen et al. |
| 2004/0190042 | A1 * | 9/2004 | Ferlitsch et al. .......... 358/1.15 |
| 2006/0080122 | A1 | 4/2006 | Klopsch et al. |
| 2006/0139678 | A1 | 6/2006 | Klopsch et al. |
| 2007/0053001 | A1 | 3/2007 | Huntley et al. |

OTHER PUBLICATIONS

US Office Action issued in U.S. Appl. No. 11/217,458 dated May 7, 2012.

Apr. 24, 2009 Extended European Search Report issued in corresp EP Appln. No. 05020581.4.

United States Office Action issued in U.S. Appl. No. 11/217,458 dated Apr. 26, 2011.

European Search Report issued in European Patent Application No. EP 06017921.5 dated May 11, 2009.

United States Office Action issued in U.S. Appl. No. 11/357,083 dated Aug. 31, 2010.

United States Office Action issued in U.S. Appl. No. 11/357,083 dated Mar. 25, 2010.

* cited by examiner

| | Single Channel | | | | |
|---|---|---|---|---|---|
| | Piece # | Pages | Time to assemble Package | Time line to present package to inserter (ms) | Max Speed |
| | 1 | 1 | 200 | 200 | 18,000 |
| | 2 | 3 | 333 | 533 | 10,800 |
| | 3 | 5 | 529 | 1062 | 6,800 |
| | 4 | 2 | 255 | 1317 | 14,100 |
| | 5 | 2 | 255 | 1572 | 14,100 |
| | 6 | 1 | 200 | 1772 | 18,000 |
| | 7 | 3 | 333 | 2105 | 10,800 |
| | 8 | 4 | 433 | 2538 | 8,300 |
| | 9 | 4 | 433 | 2971 | 8,300 |
| | 10 | 5 | 529 | 3500 | 6,800 |
| | 11 | 1 | 200 | 3700 | 18,000 |
| | 12 | 2 | 255 | 3955 | 14,100 |
| | 13 | 3 | 333 | 4288 | 10,800 |
| | 14 | 4 | 433 | 4721 | 8,300 |
| | 15 | 2 | 255 | 4976 | 14,100 |
| | 16 | 2 | 255 | 5231 | 14,100 |
| | 17 | 1 | 200 | 5431 | 18,000 |
| | 18 | 4 | 433 | 5864 | 8,300 |
| | 19 | 5 | 529 | 6393 | 6,800 |
| | 20 | 4 | 433 | 6826 | 8,300 |
| Average | | | | | 11,840 |

FIG. 7

| Dual Channel |||||||||
|---|---|---|---|---|---|---|---|---|
| | Piece # | Pages | Channel 1 feeding | Time to assemble Package | Channel 2 feeding | Time to assemble Package | Time line to present package to inserter | Max Speed |
| | 1 | 1 | x | 200 | | | 200 | 18,000 |
| | 2 | 3 | | | x | 333 | 400 | 18,000 |
| | 3 | 5 | x | 529 | | | 600 | 18,000 |
| | 4 | 2 | | | x | 255 | 800 | 18,000 |
| | 5 | 2 | | | x | 255 | 1055 | 14,100 |
| | 6 | 1 | | | x | 200 | 1255 | 18,000 |
| | 7 | 3 | x | 333 | | | 1455 | 18,000 |
| | 8 | 4 | | | x | 433 | 1655 | 18,000 |
| | 9 | 4 | x | 433 | | | 1855 | 18,000 |
| | 10 | 5 | | | x | 529 | 2055 | 18,000 |
| | 11 | 1 | x | | | 200 | 2255 | 18,000 |
| | 12 | 2 | x | 255 | | | 2455 | 18,000 |
| | 13 | 3 | | | x | 333 | 2655 | 18,000 |
| | 14 | 4 | x | 433 | | | 2855 | 18,000 |
| | 15 | 2 | | | x | 255 | 3055 | 18,000 |
| | 16 | 2 | | | x | 255 | 3310 | 14,100 |
| | 17 | 1 | | | x | 200 | 3510 | 18,000 |
| | 18 | 4 | x | 433 | | | 3710 | 18,000 |
| | 19 | 5 | | | x | 529 | 3910 | 18,000 |
| | 20 | 4 | x | 433 | | | 4110 | 18,000 |
| Average | | | | | | | | 17,610 |

FIG. 8

PRINT STREAM PROCESSING MODULE OPTIMIZER FOR DOCUMENT PROCESSING

RELATED APPLICATIONS

This application is a continuation-in-part and claims the benefit of U.S. application Ser. No. 11/217,458 Filed Sep. 2, 2005, now U.S. Pat. No. 8,218,170 entitled "MULTI-PRINT STREAM PROCESSING MODULE OPTIMIZER FOR DOCUMENT PROCESSING," which Application claims the benefit of U.S. Provisional Application No. 60/616,625 entitled "MULTI-CHANNEL PRINT STREAM OPTIMIZER FOR DOCUMENT PROCESSING" filed on Oct. 8, 2004, the disclosures of both of which are entirely incorporated herein by reference.

TECHNICAL FIELD

The present subject matter relates to techniques, equipment and program products for optimizing print streams for multiple print stream modules prior to print as well as mail processing systems that include a print stream optimizer.

BACKGROUND

Mail processing facilities often use mail processing machines, such as inserters, to print and insert mail into envelopes. The speed of these inserters is greatly influenced by the amount of material or number of pages per package. As the number of pages for a given package of mail increases, overall speed per package of an inserter decreases. This is because as a larger package is assembled, components upstream from an assembly module of the inserter slow down until assembly is complete. Hence, the assembly module limits the speed of the entire machine.

Moreover, mail processing facilities that print and process large amounts of mail obtain postal discounts if the mail is grouped by common destinations. Mail can either be grouped before or after printing. After-print grouping adds additional effort to the mail producing process. Alternatively, data grouping software organizes mail data into groups before it is ever printed and arranges the mail in a way that accomplishes maximum postal discounts. Of course, organizing the mail data into postal approved groups is not sufficient in and of itself to ensure maximum throughput and efficiency of a given mail processing machine. This is especially true when the associated print processing modules employed for printing of the mail or the configuration of the inserter varies. Variations of this nature that physically impact the mail—e.g. 3-up or higher printer or multiple inserter processing for mail production—must be properly accounted for when performing data grouping of the mail.

Hence, the inventors have recognized a need to increase the throughput of mail processing machines, accounting for variations in system configuration, while maintaining postal discounts by processing document data prior to document printing.

SUMMARY

The teachings herein alleviate one or more of the above noted problems with a method for optimizing one or more print streams prior to printing. The teachings herein relate to manipulation of representations of pages and/or documents within a print file in a manner intended to improve or optimize processing of printed documents that will be printed from the file, e.g. when processed as one or more print streams through a mail processing system.

For example, a disclosed method optimizes a print file prior to printing, wherein document pages of the print file are destined for at least a first print stream processing module and a second print stream processing module of a mail processing system. This exemplary method involves obtaining a print file, representing the documents to be printed. Representations of the documents contained within the obtained print file are sorted into mail sort groups based on one or more relevant parameters. The optimizing entails allocating and ordering representations of pages of the sorted document representations to first and second print streams, based on configurations of the processing modules and one or more attributes of each document. In this exemplary process, the allocating and reordering is done in such a manner that, for all sort groups, the processing maintains documents of each sort group together in a respective one of the print streams, so that the documents allocated to the first and second print streams will be presorted in the groups when the streams are printed. Concurrently, the processing will match the first and second print streams to configurations of the first and second print stream processing modules, respectively. The method may also involve generating at least one output print file containing representations of the documents allocated to the first and second print streams, for driving at least one printer to produce the document pages for the print streams and thus for supplying print streams containing optimized sort groups to the first and second print stream processing modules of the mail processing system.

In such a method, the step of obtaining the print file containing sorted representations of the documents may entail receiving an input print file as the obtained print file. In such an implementation, the representations of the documents in the received input print file have already been sorted based on the one or more relevant parameters. Alternatively, the step of obtaining the print file containing sorted representations of the documents may entail receiving an input print file, representing the plurality of documents to be printed, and then sorting sets of representations of the documents from the input print file into the mail sort groups based on the one or more relevant parameters, to form the obtained print file containing the sorted document representations. At least in the example where the optimizing method does the sorting in the print file processing, the one or more relevant parameters may relate to one or more parameters selected from the group consisting of: destination delivery points defined by a postal authority, parameters identifying documents configured to receive different inserts in one or more of the document processing modules, and different accounts associated with different document groups.

Another example of a method of optimizing multiple print streams prior to printing involves receiving one or more input print files, each print file containing representations of documents to be printed, and allocating and ordering representations of pages of the document representations to first and second print streams, based on configurations of the print stream processing modules and one or more attributes of each document. In this example, the allocating and ordering matches the first and second print streams to configurations of the first and second print stream processing modules, respectively. However, for each respective representation of a multi-page document from the one or more input print files, the allocating and ordering also concurrently allocates representations of all of pages of the respective multi-page document to a single one of the print streams. In this way, the processing avoids allocating pages of any one multi-page document across the two print streams and thereby avoids splitting of the pages of the one document among the two different print stream processing modules. This method may also involve generating at least one output print file containing representations of the documents allocated to the first and second print streams, for driving at least one printer to produce the documents pages for the first and second print streams and thus supplying print streams to the first and second print stream processing modules of the mail processing system.

The detailed description below also discloses a method of optimizing a print file prior to printing, which involves a step of obtaining a print file, representing a plurality of documents to be printed. In this case, representations of the documents contained within the obtained print file are sorted into mail sort groups based on one or more relevant parameters, such as those mentioned by way of example, earlier. This method also involves reordering representations of pages of the sorted document representations within the print file based on one or more attributes of each document. In this example, the print file processing reorders documents based on page counts, to improve processing efficiency of subsequent processing of the documents to be printed through a mail processing system. However, for all sort groups, the reordering still maintains documents of each sort group together in respective groups. As a result, the documents will be presorted in the groups when the documents are printed as a print stream, in response to the optimized print file.

The present teachings also encompass print stream optimizers that implement one or more processing techniques similar to those outlined above. Such an optimizer might include executable instructions for implementing the steps of the optimizing procedure, a machine readable storage medium bearing the instructions, and a programmable data processing device coupled to the storage medium for executing the instructions to perform the steps of the optimizing procedure. The present teachings also encompass various mail processing systems, each of which includes a print stream optimizer, one or more printers driven by the optimized print file from the optimizer and one or more print stream processing modules (e.g. on the front end(s) of one or more inserters).

Other concepts relate to unique software for implementing the print stream optimization(s) as summarized above. A software product or article, in accord with such a concept, includes at least one machine-readable medium and information carried by the medium. The information carried by the medium may be executable program code, one or more databases and/or information useful in implementing print stream optimization.

The examples discussed herein increase the overall efficiency of the document processing system by feeding documents to each print stream processing module in an order that increases the average speed of the collective output of the modules. The desired balance may be accomplished by feeding several small documents into one module while a larger document is being assembled in the other module. Also, the order the documents are fed into each module is determined prior to printing so that the documents are printed in the same order they will be processed. Hence, no intermediate mechanical grouping is required.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 7 depicts a table of the time it takes to assemble each document having various page counts utilizing a document processing machine having one print stream processing module.

FIG. 8 depicts a table of the time it takes to assemble each document having various page counts utilizing a document processing machine having two print stream processing modules.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
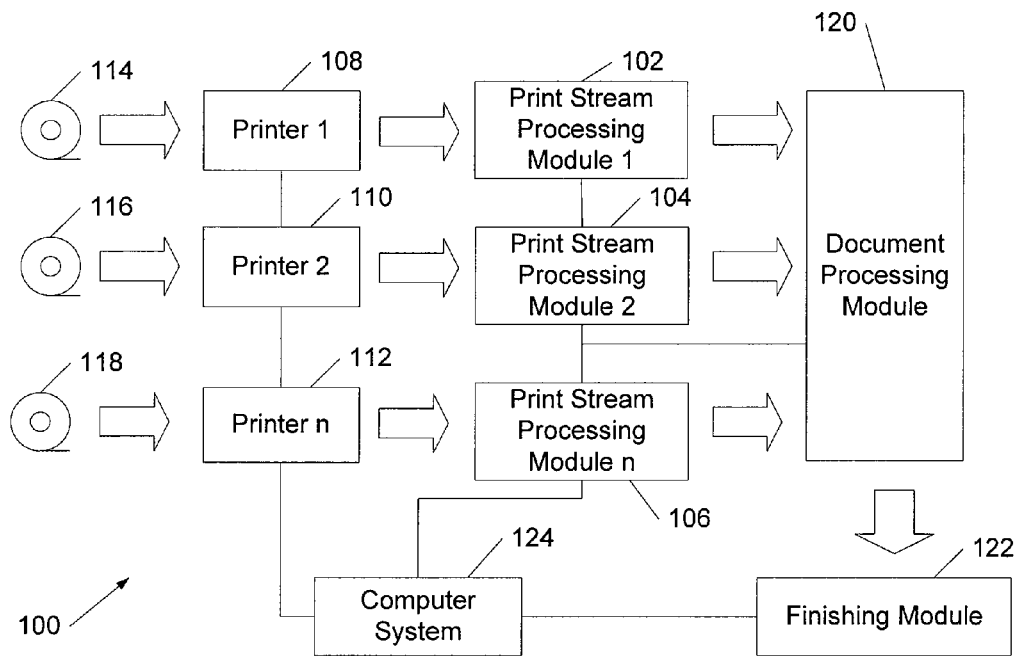
FIG. 1 depicts an exemplary high-level block diagram of a document processing system.

FIG. 1 depicts a high-level block diagram of a document processing system 100 for which throughput can be optimized utilizing the novel concepts discussed herein. Essentially, the system 100 comprises a plurality of print stream processing modules 1-n. The print stream processing module 1 is designated by number 102, the print stream processing module 2 is designated by 104, and the nth print stream processing module is designated by number 106. There may be two, three or more print stream processing modules. Each print stream processing module 102, 104, 106 may perform one or various operations such a material cutting, assembly, folding, material authentication, etc. For example, the modules may include a cutter device suitable for enabling splitting of a 3-wide printed output into distinct 1-up and 2-up rolls. Each are modular in the sense that each can be designed differently to perform one or various functions. The novel concepts discussed herein are not limited to the number of print stream processing modules or specific functions of each discussed herein.

Upstream from each print stream processing module 102, 104, 106 is a printer 108, 110, 112, each fed from a roll of continuous form material 114, 116, 118. However, non-continuous material (e.g. individual sheets) may be used. The printers 108, 110, 112 generate a print stream for the print stream processing modules 102, 104, 106, respectively. Each print stream processing module 102, 104, 106 is shown to receive a print stream from each printer 108, 110, 112, respectively. The manner in which the print streams are provided to the print stream processing modules 108, 110, 112 do not limit to the novel concepts discussed herein, and those skilled in the art will recognize that other configurations of the printers and modules are possible. The printed document streams may be applied inline, i.e. where the output of each printer is fed to a respective print stream module. Alternatively, the printed document streams may be generated offline, and assembled in bins, which are later applied to the print stream processing modules. Moreover, a printer 108, 110, 112 may feed more than one print stream processing module 102, 104, 106. A printer 108, 110, 112 may have two outputs each outputting a print stream to two print stream processing modules 102, 104, 106. For example, a 2-up printer may feed streams of printed sheets to two of the processing modules, or a 3-up printer may streams of printed sheets to two of the processing modules. 4-up or wider configurations also are contemplated. Alternatively, two or more documents streams, e.g. from multiple printers, could be fed to a single processing module for merging or the like.

A document processing module 120 positioned downstream from the print stream processing modules 102, 104, 106 processes the output of each print stream processing module. Exemplary processes may include a machine for inserting material, such as credit cards, personalized statements, advertisements, etc. A finishing module 122 positioned downstream from the document processing module 120 may be utilized to insert material in an envelope, sort the output mail, etc.

Each of the printers 108, 110, 112, print stream processing modules 102, 104, 106, document processing module 120 and finishing module 122 may be controlled by a computer system 124. The computer system 124 may have numerous functions, some of which include generating print files for each printer 108, 110, 112 from a job file; and controlling the operation of each print stream processing module 102, 104, 106, document processing module 120 and finishing module 122. Although shown as a single computer 124, those skilled in the art will recognize that a system 100 may use a network of controlled computers to implement the relevant data processing and/or control functions.

Figure 2:
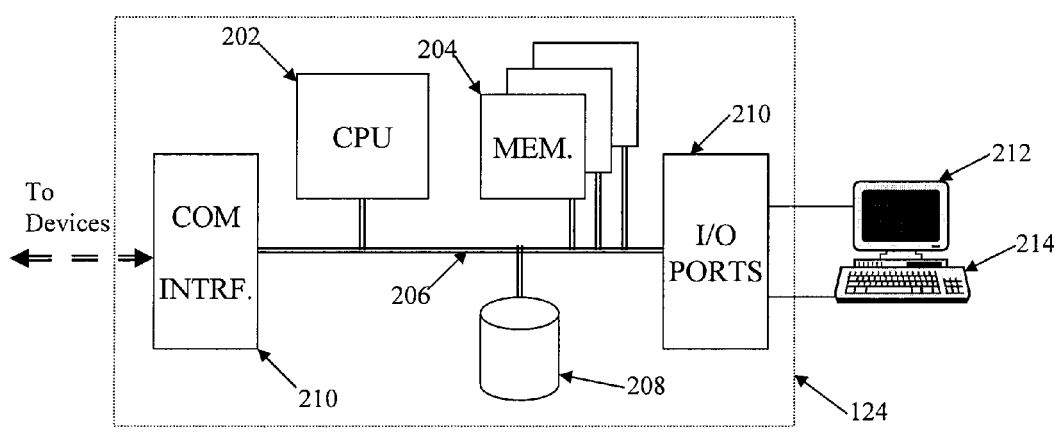
FIG. 2 depicts a general computer used in conjunction with the document processing system described herein.

FIG. 2 is a functional block diagram of such a computer system 124. The computer system 124 receives print files or generates print files from a job file, develops optimized print streams, and sends print streams to one or more printers 108-112. Based on these print streams, the computer system 124 may send United States Postal Service (USPS) or other postal authority documentation to a printer (not shown) or another appropriate output device based on the print streams sent to the printer.

The exemplary computer system 124 may include a central processing unit (CPU) 202, memories 204, and an interconnect bus 206. The CPU 202 may contain a single microprocessor, or may contain a plurality of microprocessors for configuring the computer system 124 as a multi-processor system. The memories 204 include a main memory, a read only memory, and mass storage devices such as various disk drives, tape drives, etc. The main memory typically includes dynamic random access memory (DRAM) and high-speed cache memory. In operation, the main memory stores at least portions of instructions for execution by the CPU 202 and data for processing in accord with the executed instructions.

The mass storage 208 may include one or more magnetic disk or tape drives or optical disk drives, for storing data and instructions for use by CPU 202. For a workstation PC, for example, at least one mass storage system 208 in the form of a disk drive or tape drive, stores the operating system and application software as well as a data file. The mass storage 208 within the computer system 124 may also include one or more drives for various portable media, such as a floppy disk, a compact disc read only memory (CD-ROM or DVD-ROM), or an integrated circuit non-volatile memory adapter (i.e. PC-MCIA adapter) to input and output data and code to and from the computer system 124.

The computer system 124 also includes one or more input/output interfaces 210 for communications, shown by way of example as an interface for data communications via a network or direct line connection. The interface may be a modem, an Ethernet card or any other appropriate data communications device. The physical communication links may be optical, wired, or wireless. The network or discrete interface may further connect to various electrical components of the document processing modules, discussed herein, to transmit instructions and receive information for control thereof. The network or discrete interface also will connect to the detector (shown in FIG. 3) to receive data associated with the printed material. The network shall include any type of communication implementation for receiving and transmitting information to and from components of the sorter and components external to the sorter.

The computer system 124 may further include appropriate input/output ports for interconnection with a display 212 and a keyboard 214 serving as the respective user interface. For example, the computer system 124 may include a graphics subsystem to drive the output display. The output display may include a cathode ray tube (CRT) display or liquid crystal display (LCD). Although not shown, the PC type system typically would include a port for connection to a printer. The input control devices for such an implementation of the system would include the keyboard for inputting alphanumeric and other key information. The input control devices for the system may further include a cursor control device (not shown), such as a mouse, a trackball, a touchpad, stylus, or cursor direction keys. The links of the peripherals to the system may be wired connections or use wireless communications.

The computer system 124 shown and discussed is an example of a platform supporting processing and control functions of the document processing system described herein. The optimizing functions and the computer processing operations discussed herein may reside on a single computer system, or two separate systems; or one or both of these functions may be distributed across a number of computers.

The software functionalities of the computer system 124 involve programming, including executable code as well as associated stored data. Software code is executable by the general-purpose computer 124 that functions as an inserter controller. In operation, the code and possibly the associated data records are stored within the general-purpose computer platform 124. At other times, however, the software may be stored at other locations and/or transported for loading into the appropriate general-purpose computer system. Hence, the embodiments involve one or more software products or articles of manufacture, in the form of one or more modules of code carried by at least one machine-readable medium. Execution of such code by a processor of the computer platform enables the platform to implement the catalog and/or software downloading functions, in essentially the manner performed in the embodiments discussed and illustrated herein.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the print stream optimization, etc. described herein and/or as shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Figure 3:
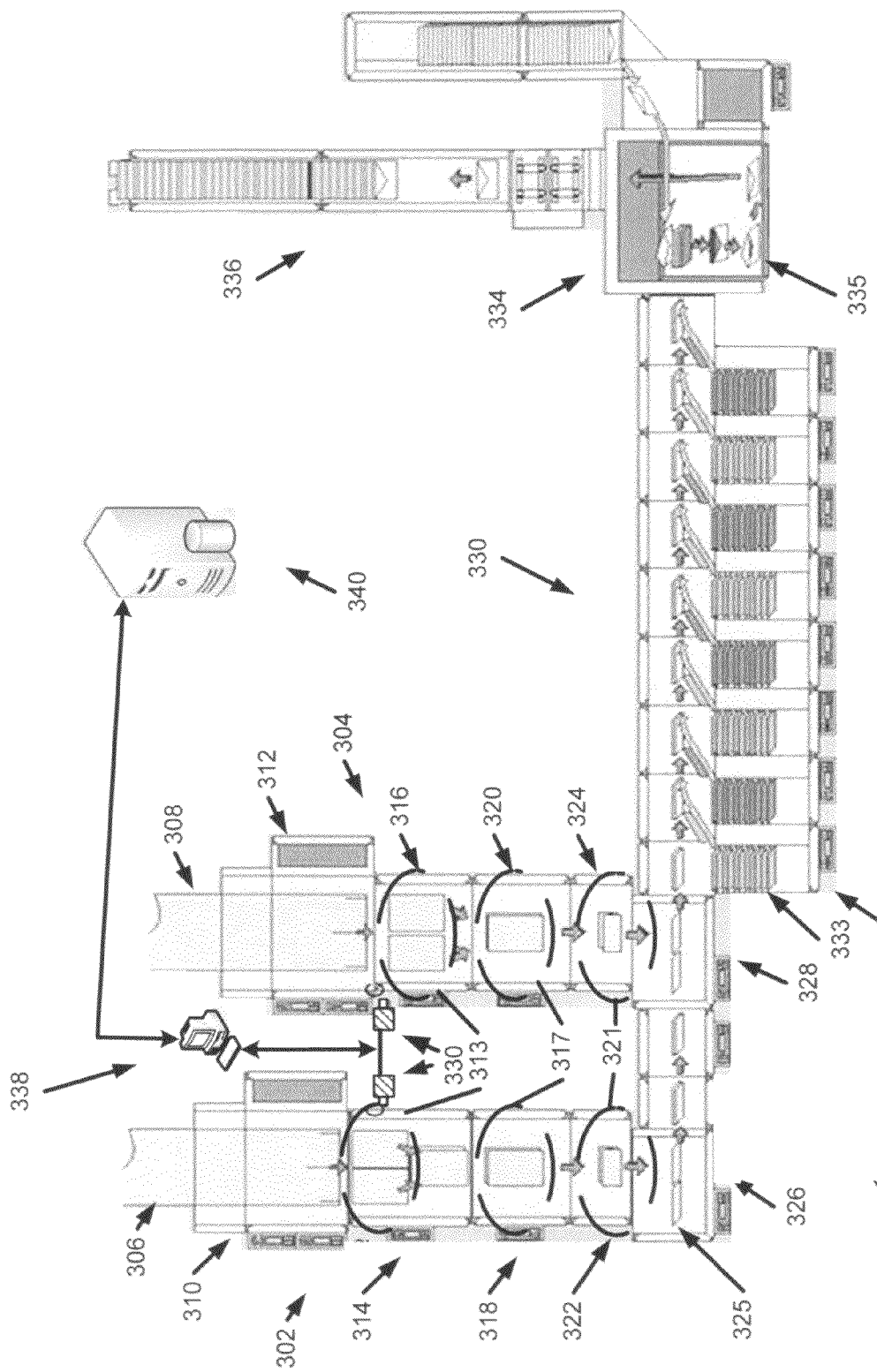
FIG. 3 depicts an exemplary document processing system in somewhat greater detail.

FIG. 3 depicts one example of a document processing machine 300 corresponding to the document processing system 100 of FIG. 1. For simplicity, only devices or modules downstream from one or more printers are illustrated. The machine 300 includes two print stream processing modules 302, 304 which generally correspond to the print stream processing modules 102, 104 of FIG. 1. However, the machine 300 can accommodate more than two print stream processing modules 302, 304. Each print stream processing module 302, 304 accommodates material that is a "2-up continuous forms input" 306, 308, e.g. from a 2-up printer. In other words, two sheets are printed and conveyed in a contiguous and continuous side-by-side and successive relationship. However, each print stream processing module 302, 304 may accommodate 1-up continuous forms input or individual input. It is even possible that one print stream processing module 302 may accommodate one input type whereas the second print stream processing module 304 may accommodate a different input type. For example, module 302 may be a print roll input while module 304 may receive fan folded printed sheets. Other options can be substituted by those skilled in the art.

In this example, each 2-up continuous forms input 306, 308 is fed to a continuous forms cutter 310, 312, each of which cuts the 2-up continuous forms input 306, 308 horizontally and vertically forming individual sheets 313. The individual sheets 313 are conveyed in the side-by-side relationship to merge modules 314, 316, each of which merge side-by-side sheets 313 into a stack 317. Often documents include more than two sheets. In such a case, the assembly modules 318, 320 downstream from the merge modules 314, 316, respectively, merge successive side-by-side sheets 313 forming a stack 317 of more than two sheets 313.

Downstream from the assembly module 318, 320, each stack 317 enters a folder module 322, 324, which is capable of folding the stack 317. In this example, the folder module 322, 324 is the last stage in print stream processing modules 302, 304, respectively. However, it is well within the level of one ordinary skill in the art to incorporate other stages in each print stream processing module 302, 304.

FIG. 3 depicts a document processing module 330, corresponding to the document processing module 120 illustrated by FIG. 1, positioned downstream from the print stream processing modules 302, 304. In this example, the document processing module 330 includes upright modules, 326, 328, each positioned to receive folded stacks 321 output from the respective print stream processing module 302, 304. The folded stacks 321 output from each print stream processing module 302, 304 are conveyed flat; the upright modules 326, 328 upright each folded stack 321, designated by number 325. The upright folded stacks 325 are conveyed consecutively to an enclosure feeder 332, which applies at least one enclosure 333 to an upright folded stack 325 as it is conveyed through the document processing module 330. The enclosures 333 may include advertising material, credit cards, or any type of material that could not be printed by printers 114, 116, 118.

Downstream from the document processing module 330 is a finishing module 334. In this example, the finishing module 334 may be an inserting module which inserts the documents output from the document processing module 330 into envelopes 335. The envelopes 335 are then output to an output conveyor 336, for later processing.

As depicted by FIG. 1, a computer system 124 controls the various devices of the document processing system 100. As depicted by FIG. 3, the computer system (for the document processing system 300) comprises a computer 338 and a database server 340. The computer 338 is primarily responsible for monitoring and controlling the operation of the document processing machine 300, and accesses the database 340 for print and control information. However, these devices need not be separate; rather they could be combined into one computer, as discussed above.

In this example, the computer 338 represents one or more computers that control the operation of the print stream processing modules 302, 304 and printers, which are illustrated by FIG. 1 to be positioned upstream from the print stream processing modules 302, 304. The computer 338 is capable of controlling other components of the document processing machine 300, as is represented by FIG. 1. The computer 338 is in communication with detectors 330, which monitor material as it is processed by each print stream processing module 302, 304. Detector 330 may be a camera or barcode scanner used to detect various attributes of the material. For mere illustrative purposes, FIG. 3 depicts one detector for each print stream processing module 302, 304. However, the detector 330 can be a plurality of detectors positioned throughout the print stream processing modules 302, 304. For instance, a detector 330 may be positioned corresponding to each module 302, 304, discussed above, of the print stream processing modules 302, 304. The positioning and usage of detectors 330 is well within the level of one of ordinary skill in the art and shall not be limiting to novel concepts discussed herein.

Like the computer system 124 in the earlier example, one of the computers 340 or 338 optimizes the print stream. In other words, it optimizes the manner in which the printers (not shown in FIG. 3) produce streams of continuous forms input 306, 308 for each print stream processing module 302, 304. In this example, optimizing assures that while one print stream processing module 302 is accumulating a document having a high page count, the other print stream processing module 304 will continue to process documents having smaller page counts.

Figure 4:
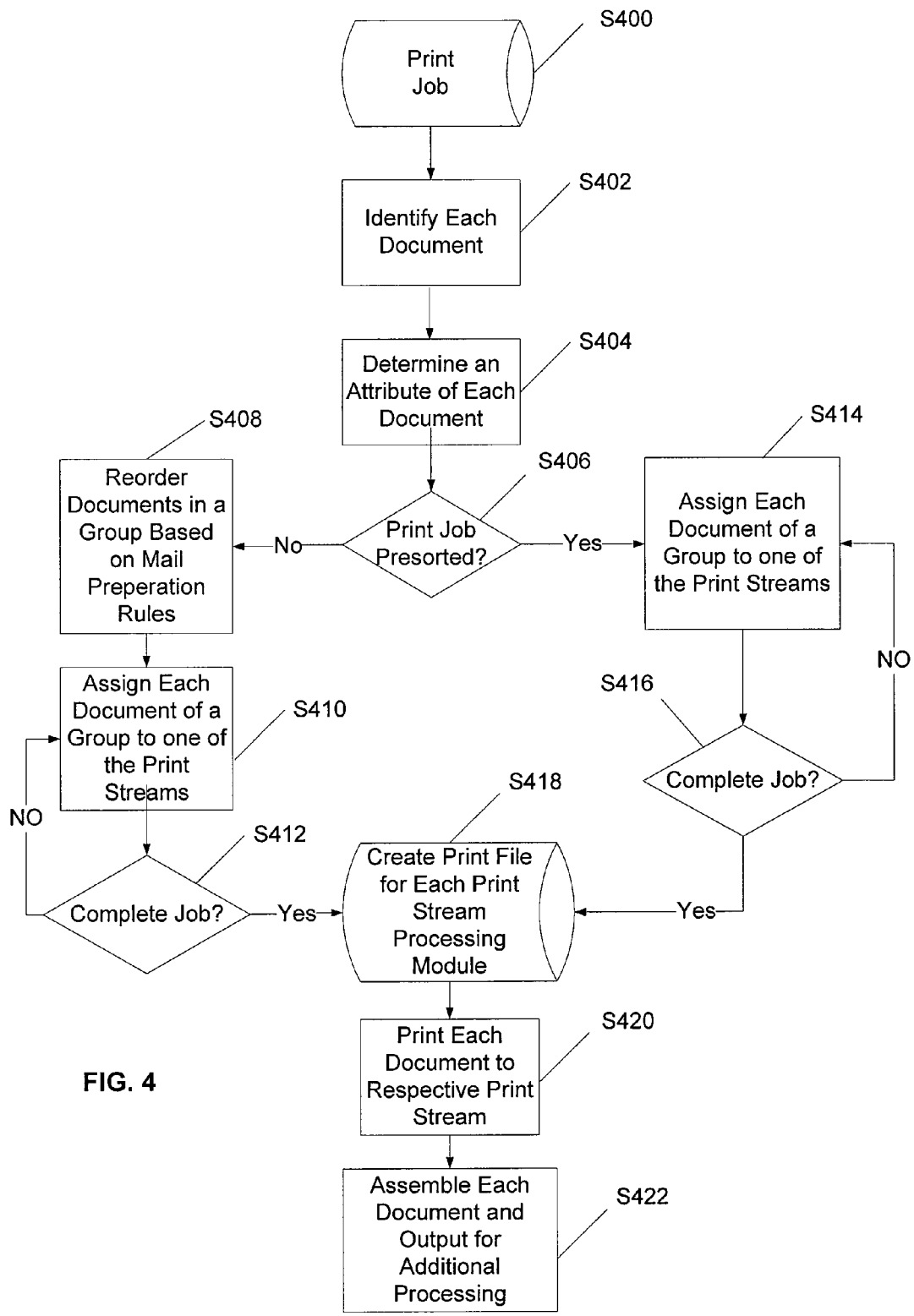
FIG. 4 is a flow chart depicting a technique by which the document processing machine throughput may be optimized.

In order to optimize the operation of the document processing machine 300, the computer optimizes the print files before the documents are ever printed. As a result, the operation of the document processing machine 300 may be optimized. FIG. 4 illustrates an exemplary flow chart showing the manner in which the operation may be optimized. By grouping documents and intelligently assigning each document to a particular print stream processing module, print stream processing modules 302, 304 (print stream processing modules 108, 110, 112 as shown by FIG. 1), and hence the document processing machine 300 (document processing system 110 as shown by FIG. 1) operates with maximum throughput.

In the figures depicting flow charts, the term "Step" is abbreviated by the letter "S." Also, as explained herein, each document to be printed has an attribute that relates to processing the respective document through the document processing systems, such as those illustrated by FIGS. 1 and 3. The attribute may include page count, type of material of the document, and destination information such as a recipient's zip code. Of course, these are not the only examples of attributes that may be considered to optimize the print streams for the print stream processing modules 302, 304. As will be explained further, documents having a high page count tend to stall the respective module when the document is being assembled. However, other document processing systems may stall based on other document attributes. For example, when a print file representative of a 1-up document is merged with that of a 2-up document, a wide format printer may be used to process the resulting merged output. However, the conglomeration of the disparate print files must ensure maintenance of presort order of the file in order to fully capitalize on the wide format print capability. In this sense, the characteristics or configuration of the printer to be employed for document production is indeed another attribute that may be considered to optimize print streams prior to print. It is well within the level of ordinary skill in the art to utilize other attributes relating to the processing of each document to optimize the print streams.

At Step 400, a print job is applied to a computer system 124. Alternatively, a remote computer system may be used to process a print job. Typically, a print job will include multiple documents to print, in fact often hundreds or thousands of documents to print, having different page counts. The computer system 124 analyzes the print job to identify each document (Step 402) and its page count (Step 404). Any type of software package known to those of ordinary skill in the art may be utilized to identify each document and its page count. Also, attributes other than the page count of each document may be determined in Step 404. For instance, utilizing the document processing machine 300 of FIG. 3, Postal Service discounts may be obtained if output mail is presorted. One way to ensure that the output mail is presorted is to group each document of a print job by common destinations, such as zip code. This avoids having to sort output mail. Hence, in Step 404, other attributes to determine may include recipient's zip code.

In Step 406, if the print job is not presorted, the computer system 124 will presort the print job by a common attribute detected in Step 404, in this example by zip code. For a given print job, Table 1 lists each document identified in Step 402 and one or more attributes determined in Step 404. In the examples of tables 1 and 2, the determined attributes include page count and zip code. Table 1 further illustrates an example of a print job that is not presorted, which is evident because the documents are not grouped by zip code. Conversely, Table 2 lists the print job (having the same contents as that listed by Table 1) that has been presorted. At Step 406, if the print job is not presorted, the documents may be ordered similar to that listed by Table 1. If the print job is presorted, the documents may be ordered similar to that listed by Table 2.

TABLE 1

Print Job

| Doc. | Pg. Cnt. | Zip Code |
|------|----------|----------|
| A    | 4        | 22203    |
| B    | 18       | 23233    |
| C    | 4        | 20005    |
| D    | 2        | 20005    |
| E    | 9        | 23233    |
| F    | 23       | 23233    |
| G    | 54       | 22203    |
| H    | 9        | 22203    |
| I    | 2        | 20005    |

TABLE 2

Print Job Presorted

| Doc. | Pg. Cnt. | Zip Code |
|------|----------|----------|
| C    | 4        | 20005    |
| D    | 2        | 20005    |
| I    | 2        | 20005    |
| A    | 4        | 22203    |
| G    | 54       | 22203    |
| H    | 9        | 22203    |
| B    | 18       | 23233    |
| E    | 9        | 23233    |
| F    | 23       | 23233    |

If in Step 406 it is determined that the print job is not presorted, the documents are grouped based on mail preparation rules (Step 408), after which processing flows to step 410. The mail preparation rules are well known to those of ordinary skill in the art, and typically correspond to the one or more attributes determined in Step 404. In step 410, if a determined attribute corresponds to a zip code, the documents will be reordered similar to that as shown by Table 2 above. If in Step 406 it is determined that the print job is already presorted, in this example, the documents already would be grouped similarly to the that shown by Table 2, therefore processing branches from 406 to step 416.

Steps 410 and 414 basically perform the same operation of assigning each document of a group to one of the print stream processing modules, such as those illustrated by FIGS. 1 and 3. Here, optimization and maximum throughput of a machine can be accomplished by intelligently assigning each document to a print stream processing module 302, 304. This selective assignment may include feeding to a print stream processing module on a different inserter device when multiple inserters are required for processing of a job. This operation will be discussed further below. The step of assigning the documents to one of the print stream processing modules is repeated for each group of documents until all documents in each group have been assigned to one of the print stream processing modules. (Step 412, Step 416). Once all documents have been assigned, a representation of each print stream is generated. For example, a print file may be created for each printer that generates a print stream for a print stream processing module 302, 304 (Step 418). In Step 420, each document is printed to a respective print stream in accordance with the respective representation or a print file generated in Step 418. In Step 422, each document is assembled and output for additional processing, as discussed above with respect to FIGS. 1 and 3.

As alluded to above, the step of intelligently assigning each document to one of the print stream processing modules enhances operation of the document processing machine 300. Specifically, grouping software controls how documents are printed and breaks a single print stream up into at least two streams, one for each print stream processing module 302, 304. Assuming two print streams, the document order in the two print streams can also be shuffled around while at least maintaining postal discounts so as to balance document sizes between the two print stream processing modules 302, 304 and increasing machine speed. In doing so, the goal is to have one print stream processing module 302, 304 continuously feeding several small documents while the other print stream processing module 302, 304 is accumulating one large document. This keeps the machine processing documents and eliminates "stalls" while processing high page count mail. After the mail is grouped by zip code (and possibly further by tray size), the documents can be sub-grouped for optimal throughput and split into two or more print streams. This will result in multiple rolls or stacks of paper, which are presented to the multiple print stream processing modules 302, 304 of the document processing machine at the same time. The running sequence number, which will be read as the pieces enter into the system, will allow the machine to put it back into the order it was before the split. The filled tray will be in the same order it would have been if the job had been done on a single print stream processing module system. It will be readily apparent to skilled practitioners that the above described splitting of print streams respective to appropriate document grouping is suitable for multiple document format needs, including multi-wide or single-wide document format.

Figure 5:
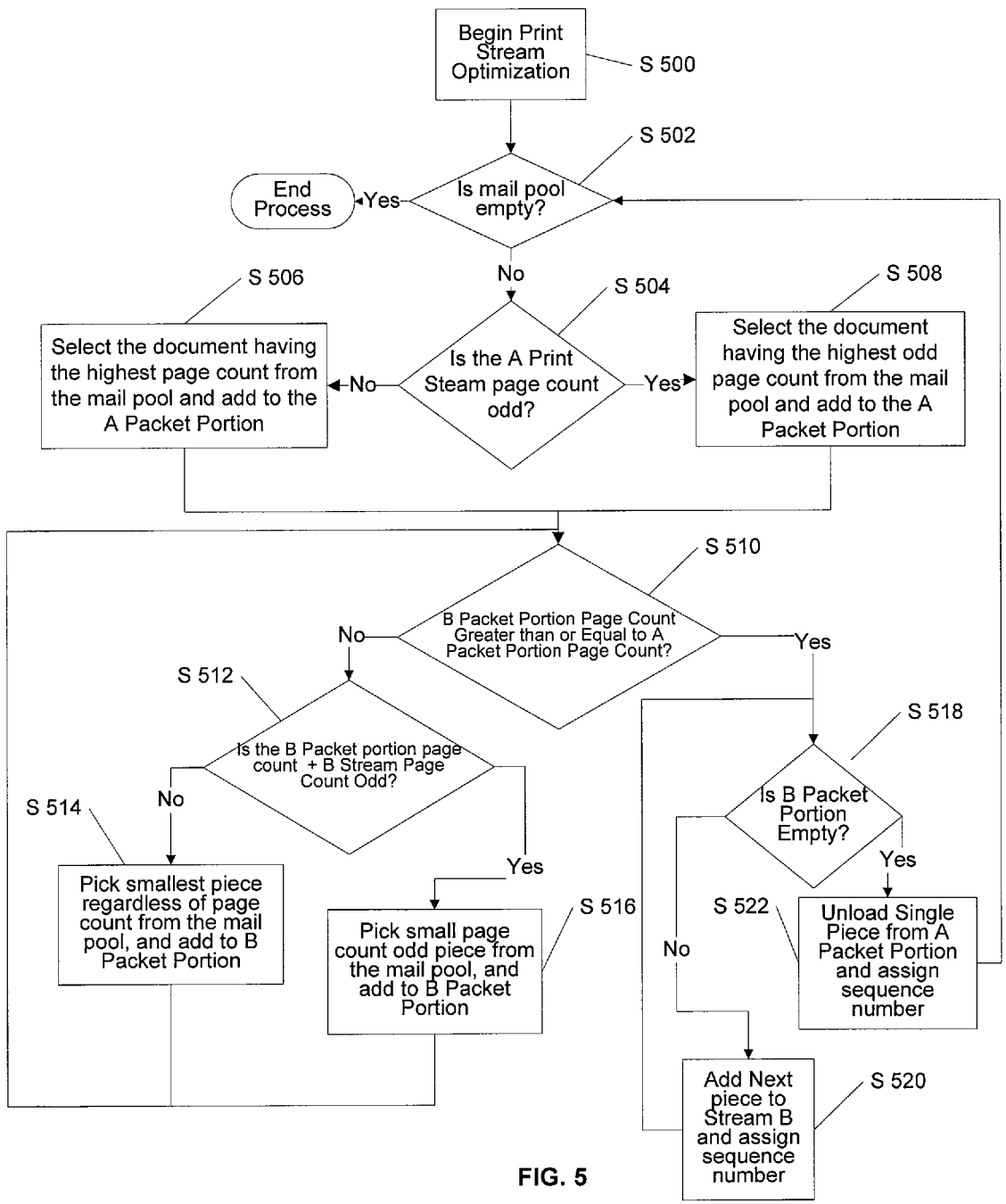
FIG. 5 is a flow chart depicting a flow chart by which to generate print files for the printers of the document processing machine.

FIG. 5 provides a flow chart of an exemplary manner to facilitate this enhancement. Essentially, the process represented by FIG. 5 corresponds the Step 410 or 414 of FIG. 4.

Documents are grouped based on a common attribute. Each group can be divided into a plurality of sub-groups or packets. Therefore, a packet of documents corresponds to one or more documents assigned to multiple print streams. A packet includes documents that are assigned to multiple print stream processing modules such that each print stream processing module processes its assigned documents concurrently with the other print stream processing module(s). This results in a balanced operation time for each print stream processing module. In one exemplary embodiment, a packet may be divided evenly among multiple print stream modules such that the page count for each assigned portions are substantially equal.

The exemplary flow chart of FIG. 5 describes the optimization of two print streams, referred to as an "A" stream and a "B" stream. A "packet" corresponds to a sub-group of documents within a given group assigned to the A and B streams. Therefore, an A packet portion corresponds to the portion of the packet assigned to print stream A. A B packet portion corresponds to the portion of the packet assigned to print stream B.

In the exemplary embodiment described with respect to FIG. 5, a balanced operation time may be achieved by assigning documents, in packets, to the A stream and the B stream such that a print stream processing module processes the packets at substantially the same time. This is achieved by assigning a document within a packet having a large page count to one print stream and assigning a set of documents within the packet having smaller page counts to a different print stream. Therefore, the print stream processing module processing the document having the large page count will finish at substantially the same time as the print stream processing module processing the documents having the smaller page counts.

Moreover, the exemplary embodiment described herein processes each print stream in a 2-up format. In the preferred embodiment, 2-up format refers to the alignment of pages in the printed material. Pages within a document are aligned side-by-side, where the left hand page is fed into the accumulator first, followed by the right hand page. Such formatting and/or orienting of inputs—where odd page numbers are always on the left—increases throughput for documents with even number page counts. However, documents having odd page counts can slow processing, as the accumulator must hold back one page since it belongs to the next document. The worst case loss of throughput occurs when an even page count document follows an odd page count document such that page one of the even page count document falls on the right side of the input printed material. In this case, all subsequent even page documents will be forced to lose an accumulation cycle.

To address the above stated concerns, the exemplary embodiment of the invention, FIG. 5, reorders the documents such that a document having an odd page count is followed by another document having an odd page count. This prevents the miss alignment of even count page documents. Step 500 marks the beginning of the print steam optimization (PSO) process in which documents are reordered. In Step 502, it is determined whether or not the mail pool is empty. The mail pool comprises the document group to be optimized and corresponds to the group in Steps 408 and 414 of FIG. 4. Once all of the documents for a given group have been optimized, the mail pool will be empty and the optimization for the given mail pool will end. Assuming that the documents have not been optimized, i.e. the mail pool is not empty, it is determined whether or not the A print stream page count is odd, i.e. if the sum of all pages for the documents in stream A is an odd number (Step 504). If the page count is not odd, a document having the highest page count is selected from the mail pool. This document is added to the A packet portion (Step 506). If the A print stream page count is odd, a document having the highest odd page count is selected from the mail pool. This document is added to the A packet portion (Step 508).

Following either Steps 506 or 508, the B packet portion page count is compared with the A packet portion page count to determine whether the B packet portion page count is greater than or equal to the A packet portion page count. If not, in Step 512 it is determined if the cumulative page count of the B packet portion and the B stream is odd. If the cumulative page count is not odd, in Step 514, the document having the smallest page count is selected. Since the cumulative page count is not odd, either an even number or odd number page count may be selected. The selected document is added to the B packet portion. On the other hand, if the cumulative page count is odd, in Step 516, the document having the smallest odd page count document is selected. The selected document is added to the B packet portion. Following either Steps 514 or 516, the process returns to Step 510.

If in Step 510, the B packet portion page count is greater than or equal to the A packet portion page count, the process advances to Step 518. In Step 518 it is determined if the B packet portion is empty. Typically, the first time this step is performed, the B packet portion will not be empty because a large document has been assigned to the A packet portion (Steps 506 or 508), however, a set of smaller documents have not been assigned to the B packet portion. In other words, assigning documents from the mail pool has not been completed. Therefore, if in Step 518, the B packet portion is not empty, Steps 518 and 520 repeat until the B packet portion is empty. As each document is assigned to the B print stream, a sequence number is assigned for tracking. Once the B packet portion is empty, a single document from the A packet portion is unloaded and assigned a sequence number. Following Step 522, the process returns to Step 502 and repeats.

At this time, a balanced operation has been accomplished for a given packet of documents. In other words, the print stream processing modules will complete processing of the given packet at substantially the same timing, with a few or no extra cycles from processing documents having odd page counts.

Figure 6:
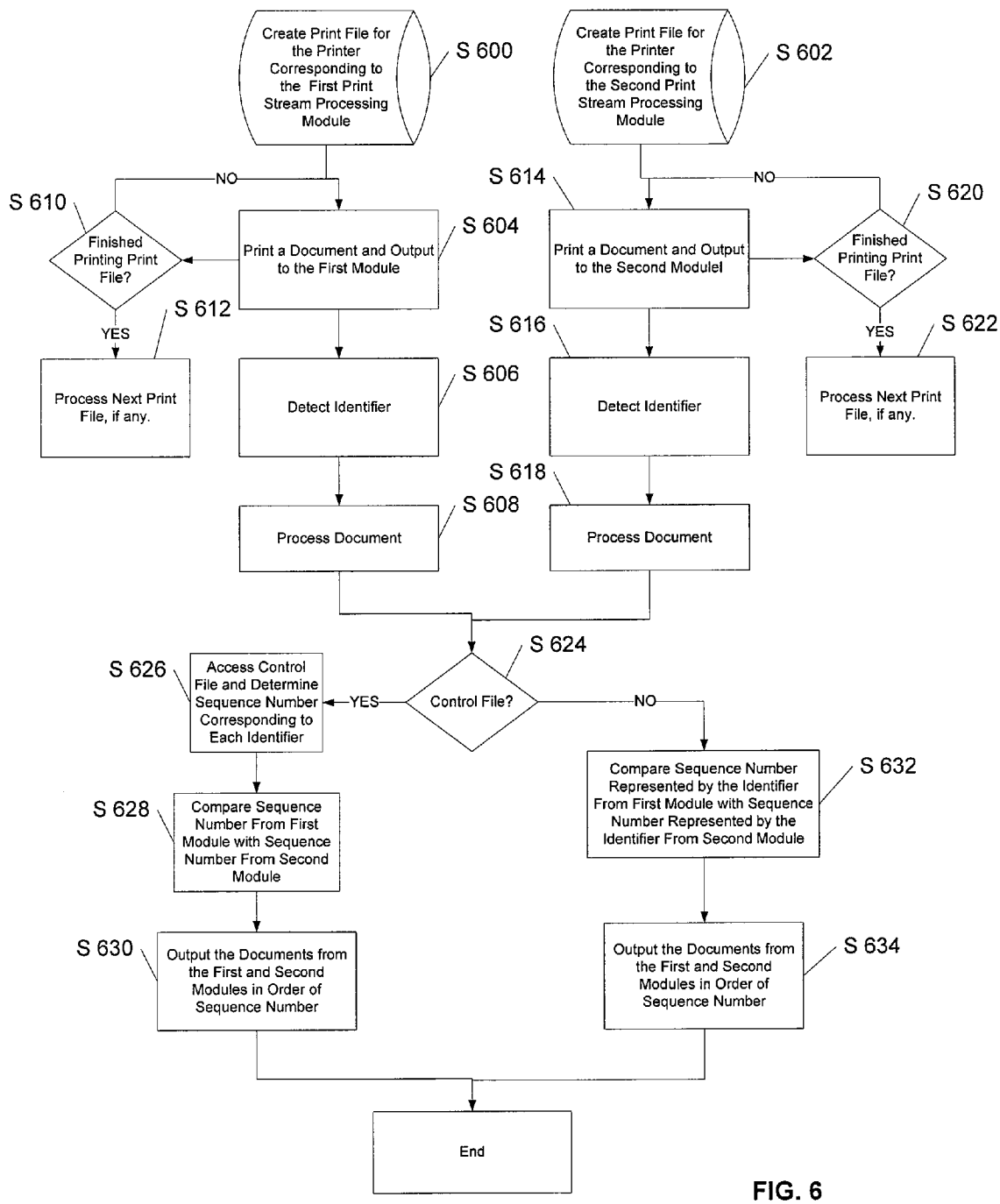
FIG. 6 depicts a flow chart of the processing and tracking of documents utilizing the document processing machine.

FIG. 6 depicts an exemplary flow chart of the manner in which the documents are processed and tracked utilizing the document processing machine 300 of FIG. 3. Steps 600 and 602 of FIG. 6 correspond to Step 418 in FIG. 4, although these steps may be performed concurrently or in combination to meet different processing requirements. However, in Step 600, a representation, e.g. a print file, is generated for the printer corresponding to the first print stream processing module 302; in Step 602, a representation, e.g. a print file, is generated for the printer corresponding to the second print stream processing module 304. Steps 604-612 are identical to Steps 614-622, respectively, except that the former correspond to the operation of the first print stream processing module 302 and the latter correspond to the second print stream processing module 304. The following description of Steps 604-612 apply to Steps 614-622, but for the different print stream processing module 302, 304.

In Step 604, the printer prints a document and outputs it to the first print stream processing module 302. Because the printers utilize continuous forms material, the printer continuously prints the documents specified by the representation of the print stream, e.g. a print file. As the continuous forms input 306 is applied to the first print stream processing module 302, the cutter module 310 separates or cuts the continuous forms input 306 into individual sheets. As explained above, when the print file is generated, a sequence number is assigned to each document (See FIG. 5). It is useful to print the sequence number on each document or each page of each document, as an identifier of the document being processed. Accordingly, the detector 330 (FIG. 3) may detect each document or document page. The identifier may be in the form of a barcode, alphanumeric character, glyph, symbol or any other manner in which to identify the document. The identifier is important to ensure that the documents output from the print stream processing modules 302, 304 are grouped to maximize postal discounts, and to ensure that the print stream processing modules 302, 304 process the documents with maximum throughput. The computer system 124 receives information from the detector 330 for each print stream processing module 302, 304 and can control the output of each print stream processing module 302, 304 such that the documents are output in order according to their sequence numbers. Steps 608 generally represent the step of processing each document, as explained above.

Often times, multiple print jobs may be executed consecutively. The system allows for a continuous operation from one print job to the next. Hence, following Step 604, the computer system determines whether the printers have finished printing a print job (Step 610). If so, the system will process the next print file, if one has been sent to the printer (Step 612). If not, the next document is printed (Step 604).

A control file may be used to track the documents as they are being processed. However, this is optional. Typically, a control file may be used if an identifier doesn't identify a sequence number. [Backwards—sequence number is proper, rather if you detect a credit card number, name, etc. etc. . . . Sequence number is unique identifier. Control file—attributes total pages within a package, additional flyer for device 333) The control file is accessed to determine the sequence number corresponding to each identifier (Step 626), and this is done for each print stream processing module 302, 304. In Step 628, the sequence number of the document being assembled is compared with the sequence number of the document concurrently being assembled in the other print stream processing module 302, 304. In Step 630, the document is output in order of its sequence number.

If a control file is not used, the sequence number may be read directly from the document or each page of the document and compared with the sequence number from the document processed concurrently. Incidentally, Steps 632-634 correspond to Steps 628-630, respectively.

It may be helpful to consider an example. As explained above, after the mail is grouped, it is printed and presented to a document processing device, such as an inserter. The speed of the inserters is greatly influenced by the amount of pages per package. Typically, the speed of the cutter and assembling unit will define the overall speed of the system.

Table 3 provides the maximum speed each print stream processing module illustrated by FIG. 3 can process a document for various page counts, for example, utilizing a BÖWE SYSTEC TURBO PLUS (18K) mail processing machine.

TABLE 3

| Pages | Max Speed | Calculated Thru-put (65%) |
|---|---|---|
| 1 | 18,000 | 11,700 |
| 2 | 14,100 | 9,165 |
| 3 | 10,800 | 7,020 |
| 4 | 8,300 | 5,395 |
| 5 | 6,800 | 4,420 |

As explained above, the computer system has the ability to break a single print stream up into two or more. For instance, it may split the stream after the mail is grouped by zip code and optimized for tray size, so as to split it up into two print streams. This will result in two rolls or stacks of paper, which are presented to the two print stream processing modules 302, 304 of the inserter at the same time. The running sequence number, which will be read as the pieces enter into the system, will allow it to be put back into the order it was before the split. Thus, the filled tray will be in the same order it would have been in if it had run on a single print stream processing module system.

The tables illustrated by FIGS. 7 and 8 provide an example of how this method would impact the speed on an inserter. The example is based on an inserting system with a maximum speed of 18,000 envelopes per hour. Therefore, a package has to be ready for the inserter every 200 ms.

As explained above, the two print stream processing modules 302, 304 complement each other to ensure maximum speed of the inserter. FIG. 7 illustrates a table of the time it takes to assembly each document ("Piece #") having various page counts utilizing one print stream processing module. FIG. 8 illustrates a table of the time it takes to assemble each document utilizing two print stream processing modules 302, 304. Test results indicate that 6.8 seconds were required to insert 20 packages without implementing the novel concepts, as opposed to only 4.1 seconds practicing the novel concepts discussed herein. This is an increase in speed by approximately 60%.

In general terms, print stream optimization as performed by a print stream optimizer (PSO) as disclosed herein, encompasses many variations of reallocating electronic representations of documents and pages thereof to be printed, from an initial format to a new format. The PSO may be implemented as an executable module operable by one or more computing systems associated with the particular inserter system configuration in question. In accordance with the examples herein, the PSO may receive as input the print file that ultimately is to be analyzed for optimization. In addition, the PSO also may be provided data descriptive of the system configuration and/or the physical format requirements of the document to be produced. Skilled practitioners will recognize that such data may be provided via a graphical user interface or other well known data feed means for input to the computer(s) serving as the optimizer.

The electronic representation (e.g. print file) is optimized to enhance the performance of document processing systems where the paper documents and pages are assembled into a specific document format. The initial format may be ordered alphabetically or ordered based on a document sequence number or other format dictated by the document creation system. The output data file from the PSO will be reordered to ensure that no document will be split across the paper cut line that frequently follows a wide format printer, or to ensure that required document sort groups are maintained. The order of documents in the output data file is a part of the optimization process.

As an example, consider that some document processing systems run faster and more reliably if the documents are ordered based on descending document page count. Although the PSO is designed for optimization, the structure of the input print file may force sub-optimization where production cycles of the document processing system will be lost. If required, the PSO will ensure that all documents for a sort group remain together when other document allocations, which affect the efficiency of the document processing system, are processed. Sort groups may be groups of delivery points that are defined by a postal authority. Arranging the mailpieces by these predefined sort groups can result in significant postage discounts. The grouping of delivery points into sort groups is frequently referred to as presorting by those skilled in the art. Those skilled in the art may define other sort groups which by example may include documents that are configured to receive different inserts in the document processing module, different accounts or other parameters that need to be grouped due to operational considerations. Hence, the PSO is effective for accounting for paper cut lines and subsequent document processing system efficiency improvements—physical or systemic characteristics that impact document output.

Figure 9:
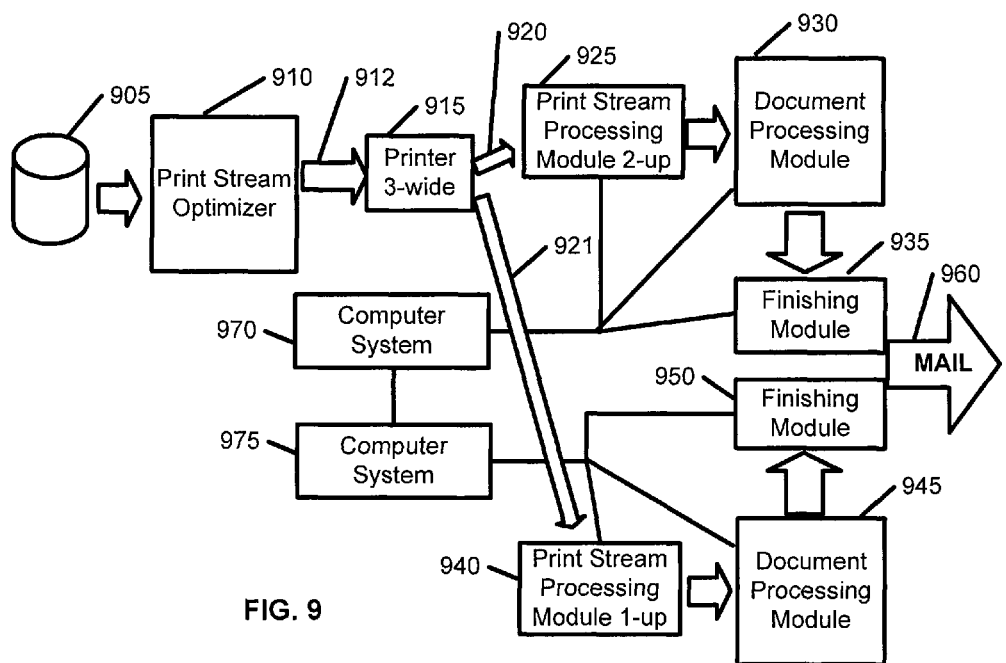
FIG. 9 depicts an exemplary system configuration for a three wide or 3-up printer suitable for producing document output destined for processing by multiple document processing machines.
Figure 9A:
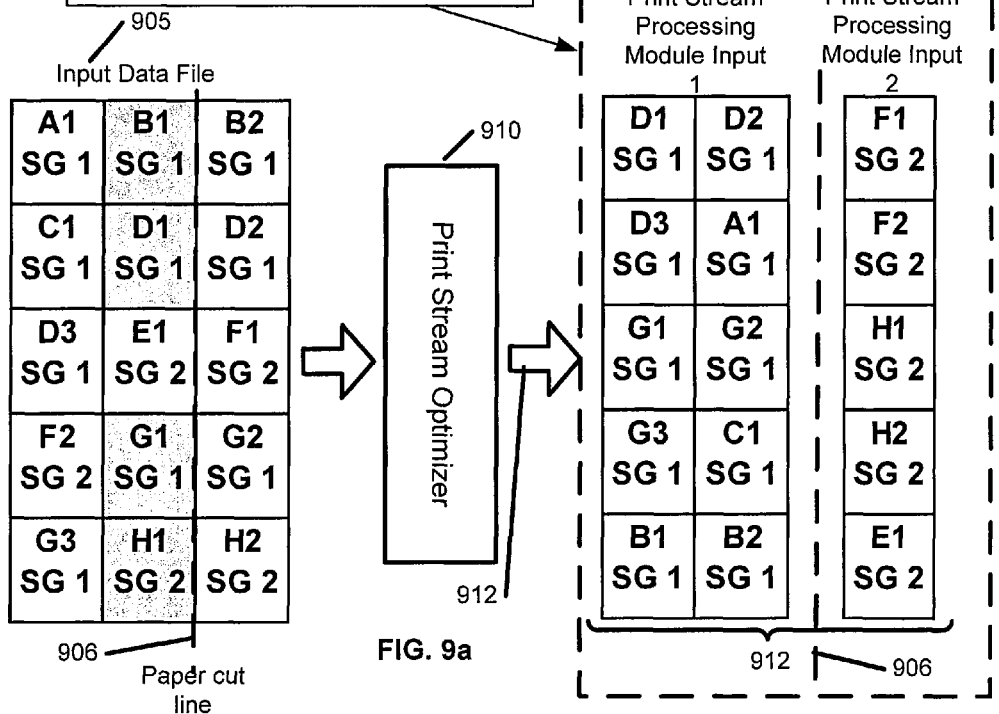
FIG. 9a depicts an exemplary document page layout before and after print stream optimization to enable maximized efficiency of the three wide or 3-up system configuration presented in FIG. 9.

It may be helpful to consider a few additional examples of system configurations that might take advantage of PSO processing as well as associated examples of PSO, with reference to FIGS. 9 to 12a. Turning first to FIGS. 9 and 9a, an exemplary system configuration and a corresponding optimized document output pursuant to the print stream optimization techniques presented herein are depicted respectively. In particular, FIG. 9 presents a system configuration that is different than that presented in exemplary FIG. 1, but nonetheless suited for the optimization process. The system input print file 905 is shown as a three wide print file with a layout for a printer 915 that produces three pages simultaneously across the printer output. The initial three wide output, for example, would be A1, B1, and B2 (see FIG. 9a), where A and B are different documents. The print file next includes a single page document C (only page C1) and a three page document D (pages D1, D2, D3). The three wide output therefore includes C1, D1 and D2 together, although the last page D3 of the document D is printed together with pages of subsequent documents E and F.

Although, the printer paper input is frequently a large roll of suitable width, other formats such as a fanfold format are acceptable. In either case the printed paper 920 and 921 must be cut lengthwise in order to be processed on a document processing system that can accept 2 wide or 1 wide page layouts. The cut line for the current example is shown at 906 in FIG. 9a. Pages to the left of the cut line 906 are directed over path 920 to a 2-up print stream processing module 925, whereas pages to the right of the cut line 906 are directed over path 921 to the 1-up print stream processing module 940. For the initial stage print example, from the input print file 905, the paper cut line 906 would divide the output between B1 and B2. Sheets A1 and B1 would go over the path 920 to the 2-up print stream processing module 925, however, page B2 would go over the path 921 to the 1-up print stream processing module 940. This situation poses a significant problem if printed in this format; since the cut rolls are to be run on different document processing systems 925, 940, and it will not be possible to combine the B1 and B2 pages into a single document during production. Other pages D1, G1, and H1 (shown in gray) should also not be produced as shown in the input print file 905. Consequently, effective processing considering the system configuration presented in FIG. 9 and the physical format requirements of the document to be produced as shown in FIG. 9A require a suitable means of optimization. The process of optimization in some instances enables the running of the printed material on one or more document processing systems by ensuring that all pages of a document can be assembled together by the one or more document processors. Without the enablement function, the printed material may be reduced to scrap without PSO. Those skilled in the art will likely find it desirable to consider the enablement function of PSO whenever they are implementing the processes to optimize the input print file to enable or otherwise improve the performance of the document processing system.

The system components in FIGS. 9 and 9a include the input print file, which is loaded into the PSO 910, which may be implemented as an executable module operable by one or both of the computer systems 970 and 975. The computing systems 970 and 975 may also enable control of the 3-wide printer 915. The PSO 910 converts the input print file 905 into a single print file 912 that conforms to the printer requirements and has allocated the documents and pages according to the paper cut line 906, sort groups (SG 1, SG 2, etc.) and any other requirements that govern the allocation of documents and pages into a specific arrangement as mentioned above. Such requirements or parameters may be provided as input to the PSO 910 to enable analysis sufficient to render the desired output 980. For this example, the resulting printer control file 912 will have a format that controls printing on a three page wide format (3-up) with a layout defined by print stream processing module (PSPM) inputs 1 and 2 (920 and 921 FIG. 9*a*). Section 980 is a representation of the layout for both the PSO output electronic print control file 912 and the printed paper rolls 920 and 921 after the roll is cut along the cut line 906. Since the format of the pages in the print control file and layout of the printed paper rolls are the same, the PSPM input is used to reference either the electronic print stream processing module input format or the printed and cut format (PSPM input) of the PSO process. Those skilled in the art will appreciate that the before and after optimization result may be presented or reported in advance of print by the PSO 910 such as via a user interface means operable by computer system 970 and/or 975. FIG. 11 is an exemplary flow chart of the process performed by the PSO 910 and either the three wide format printer 915 or a four wide printer 15 (FIG. 10), where the printed material will be run on two separate document processing inserter systems.

The allocation of documents and pages to the output file format 912 and resulting two paper rolls is shown in FIG. 9*a* as Print Stream Processing Module (PSPM) input 1 (920) and input 2 (921). PSPM input 1 is two pages wide, with the largest document D1, D2, D3 first followed by the smallest odd page count document A1. Members of sort group 1 (SG 1), documents and pages are allocated to PSPM input 1 (920). Members of sort group 2 (SG 2) are allocated to PSPM input 2, one page wide, in descending order. FIG. 11 presents the top level flow steps used to allocate the input print file documents, pages and sort groups to PSPM inputs 1 and 2.

The inserting system such as processing module 930, for the two page wide PSPM input 1 (920), uses a PSPM 2-up configuration document processing module shown at 925. This module cuts the pages from the 2 wide paper roll and accumulates all pages of a document together in an accumulator. The accumulator outputs the assembled document into a folder that folds the pages to match the envelope form factor. The completed document is then transferred to the document processing module 930 where inserts are added. The final step is processing by the finishing module 935 where the contents are inserted into an envelope. All inserter modules are controlled by computer 970.

The inserting system such as processing module 945, for the one page wide PSPM input 2 (921), uses a PSPM 1-up configuration document processing module shown at 940. This module cuts the pages from the 1 wide paper roll and accumulates all pages of a document together in an accumulator. The accumulator outputs the assembled document into a folder that folds the pages to match the envelope form factor. The completed document is then transferred to the document processing module 945 where inserts are added. The final step is processing by the finishing module 950 where the contents are inserted into an envelope. All inserter modules are controlled by computer 970 and/or 975. The completed envelopes from both inserters are combined at 960 to produce the mailing for delivery by the delivery authority. The delivery authority can be, but is not limited to, a postal authority, a private post or a courier service. Numerous configurations of document processing systems, printers and inserters maybe configured by those skilled in the art to process documents, wherein the PSO may be adjusted as required to meet these configurations.

Figure 10:
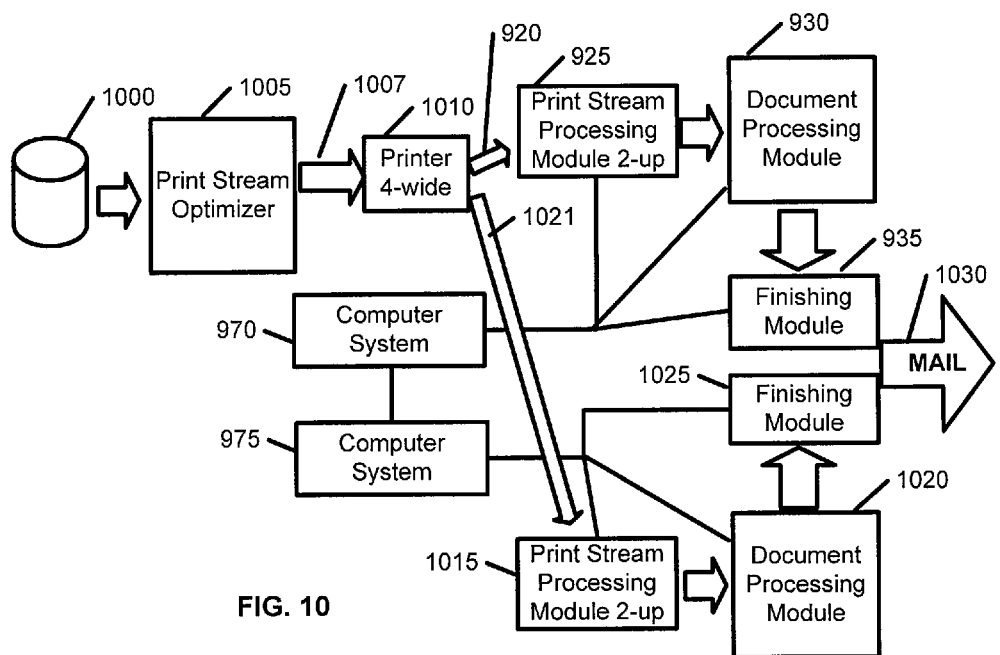
FIG. 10 depicts an exemplary system configuration for a four wide printer suitable for producing document output destined for processing by multiple document processing machines.
Figure 10A:
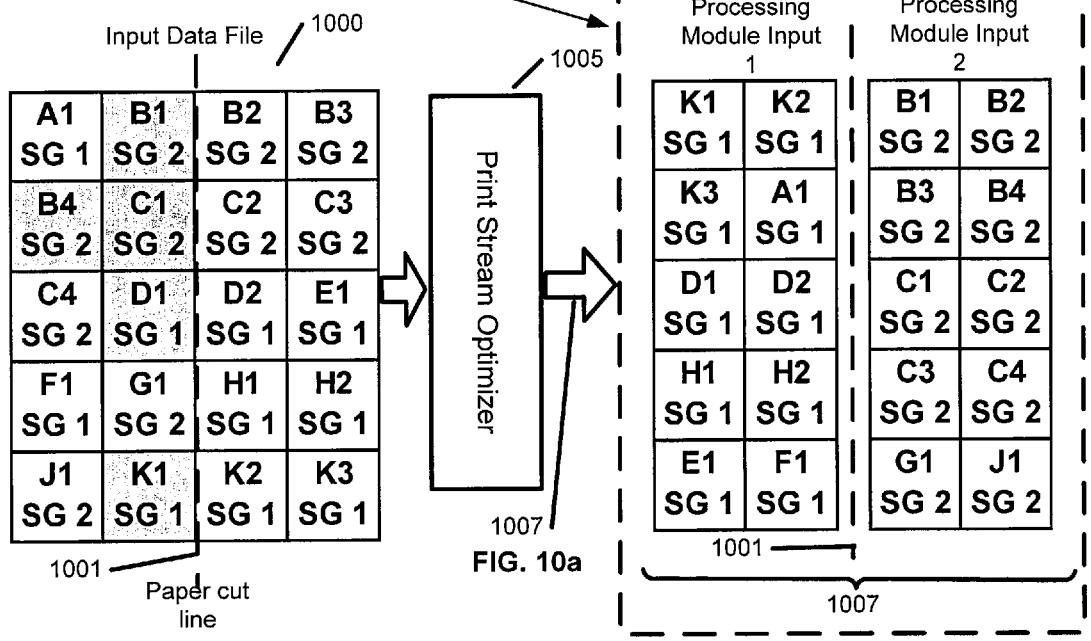
FIG. 10a depicts an exemplary document page layout before and after print stream optimization to enable maximized efficiency of the four wide system configuration presented in FIG. 10.
Figure 11:
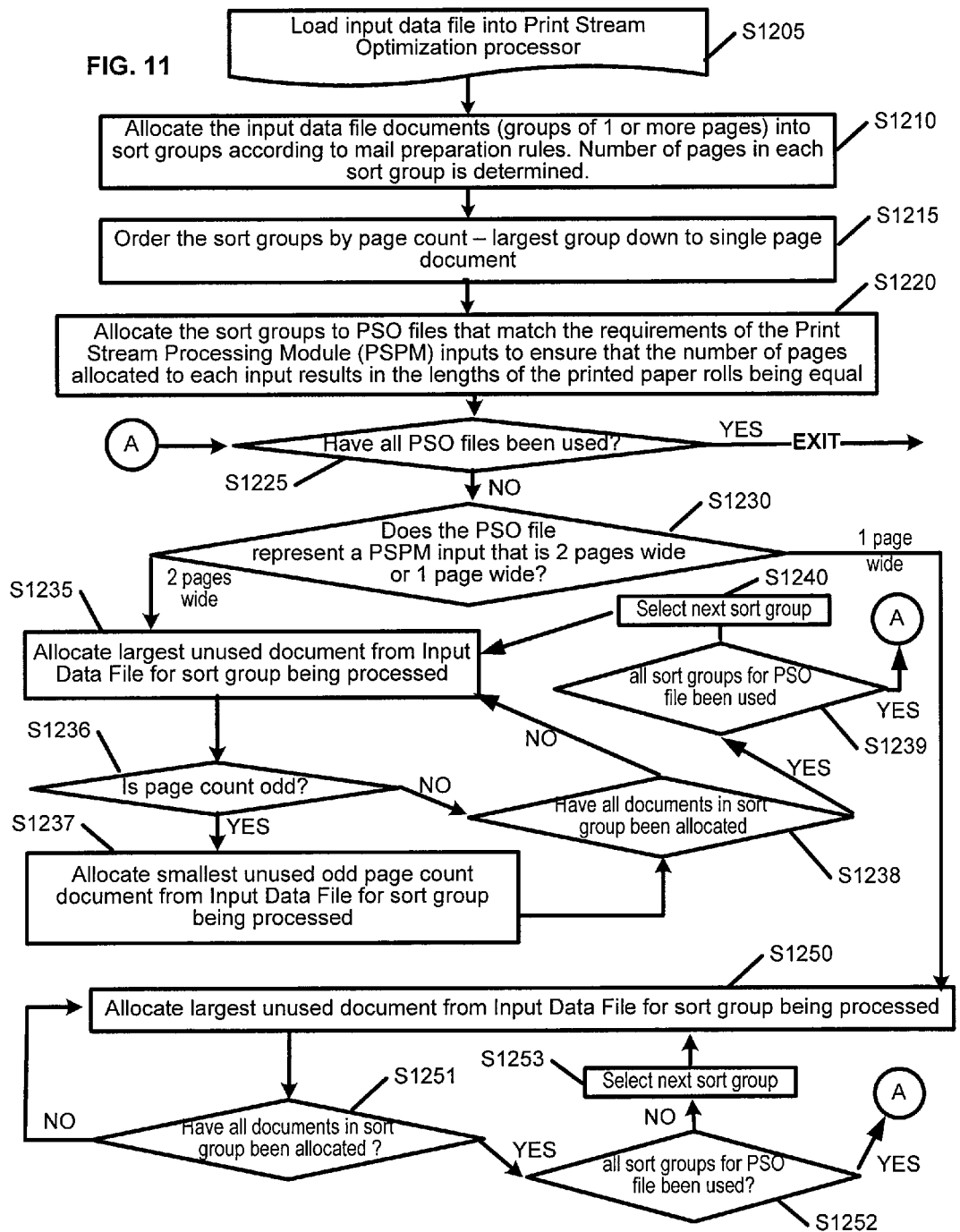
FIG. 11 is a top level flow chart of the steps performed by another exemplary print stream optimization process.

Referring now to FIGS. 10 and 10*a* an exemplary system configuration and a corresponding optimized document output pursuant to the print stream optimization techniques presented herein are depicted respectively. In particular, FIG. 10 presents a system configuration featuring a printer that prints in a format 4 pages wide. The system input print file 1000 is shown as a four wide print file with a layout for a printer that produces four pages of a document across the printer output, such as sheets A1, B1, B2, B3 etc. represented by FIG. 10*a*, where A, B, etc. are different documents. As in the previous example, the print file includes documents intended for a number of different SG sort groups.

Although, the printer paper input is frequently a large roll of suitable width, other formats such as a fanfold format are acceptable. In either case the printed paper 920 and 1021 must be cut lengthwise in order to be processed on document processing systems that can accept 2 wide or 1 wide page layouts. As in FIG. 9*a*, the cut line for the current example is shown, that is to say at 1001 in FIG. 10*a*. For the input print file 1000, the paper cut line 1001 would divide the second document (B) output between sheets B1 and B2. Once again, as the cut rolls are to be run on different document processing systems (e.g. 925 and 1015 in FIG. 9), it will not be possible to combine the B1, B2, B3 and B4 pages into a single document B during production without proper optimization. Other pages C1, D1, and K1 (shown in gray) should not be produced as shown and therefore the layout must be corrected by the print stream optimizer 1005.

The system components in FIGS. 10 and 10*a* include the input print file, which is loaded into the PSO 1005 (configured for 4 wide processing). The PSO 1005 converts the input print file 1000 into a single print file 1007 that conforms to the printer requirements and has allocated the documents and pages according to the paper cut line 1001, sort groups (SG) and any other requirements that govern the allocation of documents and pages into a specific arrangement as mentioned above. The resulting printer control file 1007 will have a format that controls printing on a four page wide format with a layout defined by PSPM inputs 1 and 2 (920 and 1021 FIG. 10*a*). Section 1045 is a representation of the layout for both the PSO output electronic print control file 1007 and the printed paper rolls 920 and 1021 after the roll is cut along the cut line 1001. Since the format of the pages in the print control file and layout of the printed paper rolls are the same, the PSPM input is used to reference either the electronic print stream processing module input format or the printed and cut format (PSPM input) of the PSO process. FIG. 11 is an exemplary flow chart of the PSO process 1005, which in this example, is for four wide format printers 1010 where the printed material will be run on two separate document processing inserter systems.

The allocation of documents and pages to the output file format 1007 and resulting two paper rolls is shown in FIG. 10*a* as Print Stream Processing Module (PSPM) input 1 (920) and input 2 (1021). As shown in FIG. 10*a*, for example, PSPM input 1 is two pages wide, with the largest document K1, K2, K3 first followed by the smallest odd page count document A1. Members of sort group 1 (SG 1), documents and pages are allocated to PSPM input 1 (920). Members of sort group 2 (SG 2) are allocated to PSPM input 2 (1021). PSPM input 2 (1021) is two pages wide, with the largest document B1-B4 followed by the next largest document C1-C4 and completed with two single page documents G1 and J1. Refer to FIG. 11 for the top level flow steps used to allocate the input print file documents, pages and sort groups to PSPM inputs 1 and 2.

The inserting system such as processing module 930 for the two page wide PSPM input 1 (920), uses a PSPM 2-up configuration document processing module shown at 925. This module cuts the pages from the 2 wide paper roll and accumulates all pages of a document together in an accumulator. The accumulator outputs the assembled document into a folder that folds the pages to match the envelope form factor. The completed document is then transferred to the document processing module 930 where inserts are added. The final step is the finishing module 935 where the contents are inserted into an envelope. All inserter modules are computer controlled 970.

The inserting system such as document processing module 1020, for the two page wide PSPM input 2 (1021), uses a PSPM 2-up configuration document processing module shown at 1015. This module cuts the pages from the 2 wide paper roll and accumulates all pages of a document together in an accumulator. The accumulator outputs the assembled document into a folder that folds the pages to match the envelope form factor. The completed document is then transferred to the document processing module 1020 where inserts are added. The final step is the finishing module 1025 where the contents are inserted into an envelope. All inserter modules are controlled by computer 970 and/or 975. The completed envelopes from both inserters are combined at 1030 to produce the mailing for delivery by the delivery authority.

FIG. 11 is an exemplary flow chart of the PSO process which corresponds to the examples shown in FIGS. 9*a* and 10*a*. The process starts with inputting the electronic file that represents the documents and pages that need to be printed (S1205) into a processor such as computer 124 of FIG. 1 or FIG. 2. The electronic file may be in many formats which are compatible with the control characteristics of the target printer, such as XML, Postscript, HTML or CXML to mention a few examples. For the situation where sort groups must be maintained, step S1210 allocates the documents (groups of 1 or more pages) into sort groups in accordance with the sort group rules. The sort group rules may be the postal authority defined groupings of delivery points for the mailpieces that will be manufactured from the printing and insertion of the printed material into envelopes. As stated before, the parametric input to the PSO for the print file as presented in step 1205 may be that suitably descriptive of the system configuration or format requirements relative to the document(s) to be produced. Alternatively, format requirements such as the desired print format may be discerned through analysis of the print file.

The allocation of documents into sort groups in step S1210 also determines the total number of pages for all of the documents allocated into each sort group. The documents in the resulting sort groups are ordered from largest to smallest according to page count, in step S1215. This step (S1215) is needed for those post printing document processing systems that run more efficiently when processing large documents first. Since the documents will be printed on a single roll of large format paper, the PSPM inputs 1 and 2 must use the same length of paper to avoid wasted blank pages. For the implementation of FIG. 9*a*, 2-up PSPM input 1 (920) should have twice as many pages as 1-up PSPM input 2 (921). For the implementation of FIG. 10*a*, both PSPM inputs 1 and 2 (920, 1021) should have an equal number of pages. Documents and pages are allocated to PSO files 1 or 2. These PSO files reflect the requirements of the PSPM inputs 1 or 2. The document allocation is done in a manner which preserves all documents in a sort group within the same PSO file. The PSO files are used as temporary files for storage of documents or pointers to documents in the input print files 905 or 1000. This allocation technique ensures that documents and sort groups are never divided across multiple PSPM inputs, which would produce a printer output that could not be processed on a document processing system. In step S1220, the sort groups are allocated to PSO files based on the page count data from step S1210 to minimize any wasted paper due to unequal lengths.

Two or more PSO files may be created with the PSO process. Step S1225 implies that each PSO file is processed serially; however, those skilled in the art may chose a parallel processing architecture or a combination of serial and parallel steps. If there are PSO files which not have been processed S1225 then the process must determine if the PSPM input to be processed is two pages wide or one page wide S1230. If the PSPM input is 2 pages wide, such as based on input data provided to the optimizer directly or through analysis of the print file format itself, the allocation process starts with the document with the largest page count for the PSO file currently being processed, step S1235. If this document allocation makes the total page count an odd number, the next document to be allocated is the smallest odd page count document that is available, steps S1236 and S1237. These steps are used when the document processing system runs more efficiently and has a fewest number of lost cycles when the summation of all the pages allocated is maintained as an even number. If all of the documents associated with a sort group S1238 are not used, then the cycle of steps S1235, S1236 and S1237 are repeated until all of the documents in the sort group are used. When all documents in the sort group are allocated S1238, the contents of the PSO file are evaluated to determine if any unallocated sort groups remain S1239. If unallocated sort groups remain, the next group is selected at S1240, and processing continues with step S1235. If no sort groups remain, then control is returned to step S1225.

If the result of step S1230 indicates that the PSO file for the PSPM input is one page wide, control is transferred to step S1250. In step S1250, the largest page count document is selected from the PSO file for the sort group being processed. Steps S1251 and S1250 are repeated until all documents in the sort group are allocated. If the PSO file contains additional unallocated sort groups S1252, the next sort group is selected S1253. Steps S1250, S1251, S1252 and S1253 are repeated until all documents and sort groups are allocated from the PSO file to the corresponding PSPM input print control file. At conclusion of the process flow S1225 the PSO process is exited and the printer control file maybe sent to the printer for printing. The actual file structure for temporary data storage (PSO files) and the processes for associating entries from the input print file to the PSPM input printer control files in compliance with the steps of FIG. 11 can incorporate numerous implication approaches without affecting the effectiveness of PSO.

Figure 12:
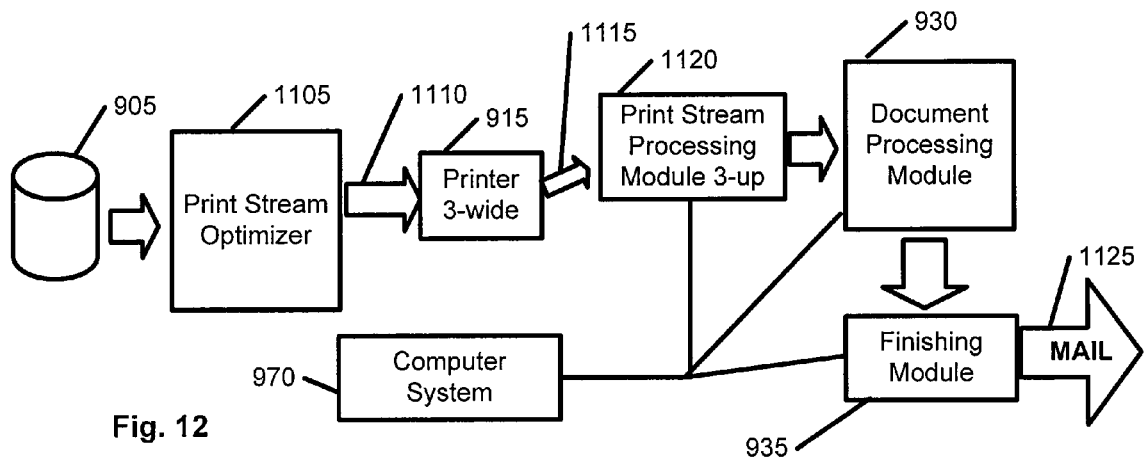
FIG. 12 depicts an exemplary system configuration for a three wide printer suitable for producing document output destined for processing via a single document processing machine.
Figure 12A:
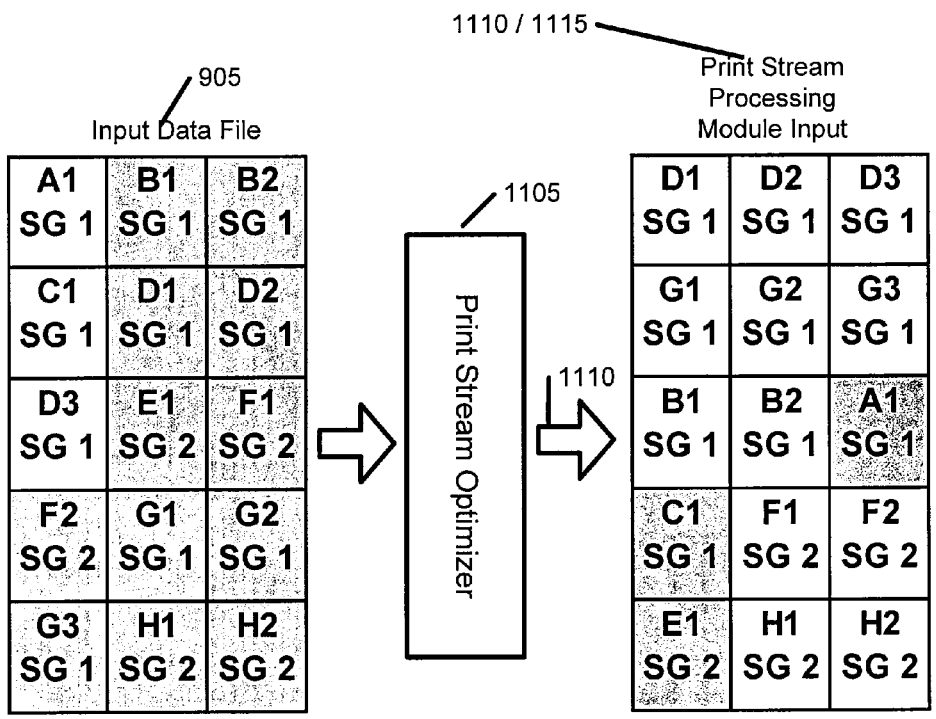
FIG. 12a depicts an exemplary document page layout before and after print stream optimization to enable maximized efficiency of the system configuration presented in FIG. 12.

Although not currently in use, especially within document processing device environments and the like, 3-up document processing systems will evolve as wide format printers become more available. Page widths greater than 3 will be a possibility for additional applications to accommodate varying document processing requirements. Even with the availability of these capabilities today, skilled practitioners will recognize that a suitable means of print stream optimization is still required to make post printer processing possible or efficient. PSO functions of page alignment, sort group maintenance and document page count ordering are required as shown in the example for FIGS. 12 and 12*a*. For this example the input print file 905 is organized in alphabetical order. During post print processing, document pages B1 and B2 are delayed due to the extra processing cycles while A1 is processed; D1 and D2 are delayed while C1 is processed; E1 is delayed while D3 is completed with pages D1 and D2; pages F1 and F2 are separated across rows of the printout causing further delays; G1, G2 and G3 are all produced out of sort group order, plus H1 and H2 are delayed. In all, 12 pages out of 15 require additional machine cycles to process or result in production errors for sort group continuity. These problems can be reduced or eliminated with effective optimization performed by a PSO 1105 as presented in FIG. 11. Therefore the input print file 905 is input into the PSO process 1105 to produce the electronic version of the print stream processing module input 1110 that is used to control the printer 915. The new or optimized format, for the electronic file 1110 and the printed document pages 1115, is shown in FIG. 12*a*.

The output format has the documents ordered by descending size and sort group. For this example, only 3 out of 15 document pages require additional machine cycles. The finished printed page roll can then be loaded on the 3-up print stream processing module 1120 for processing by the inserter system such as document processing module 930. The 3-up print stream processing module 1120 cuts the pages from the 3 wide paper roll and accumulates all pages of a document together in an accumulator. The accumulator outputs the assembled document into a folder that folds the pages to match the envelope form factor. The completed document is then transferred to the document processing module 930 where inserts are added. The final step is the finishing module 935 where the contents are inserted into an envelope. All inserter modules are controlled by a computer 970. The resulting mailpieces 1125 are delivered to the postal service for delivery to customers.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of optimizing an input file to create an output print control file prior to printing to increase throughput of a mail inserting system, wherein document pages of the output print control file are destined for at least a first print stream processing module (PSPM) and a second PSPM of the mail inserting system, the method comprising steps performed by a processor for:
    (a) obtaining an input data file or a print file, representing a plurality of documents to be printed, wherein representations of the documents contained within the obtained print file or input data file are optionally sorted into mail sort groups based on one or more relevant parameters;
    (b) based on configurations of the first and second PSPMs and one or more attributes of each document, allocating and ordering representations of pages of the sorted document representations for increasing the throughput of the mail inserting system to an output print control file, wherein:
    the representations of documents are allocated into electronic first and second print stream processing module inputs (PSPMI), wherein the first PSPMI is to be processed on the first PSPM, and the second PSPMI is to be processed on the second PSPM, while maintaining the sort groups together within the first and second PSPMIs and taking into consideration the processing configuration of the first and second PSPMs on the mail inserting system,
    the representations of documents are allocated to the first PSPMI in a two-wide page configuration and the representations of documents are allocated to the second PSPMI in a one-wide page configuration, while maintaining integrity of the sort groups,
    the representations of documents are allocated in the PSPMIs according to a page count for each document representation in the respective PSPMI based on the processing parameters of each PSPM to yield optimal processing throughput for the mail inserting system with both the first and second PSPMs running concurrently, and
    allocations within the output print control file enable the first and second PSPMIs to be separated post printing into two separate printed rolls of paper or two separate printed fan folded paper stacks to be processed on the first PSPM or the second PSPM, and
    (c) generating the output print control file containing optimized representations of the documents allocated to the first and second PSPMIs, suitable for controlling at least one printer capable of printing the document pages in a three-wide format to produce the printed representation of the first PSPMI and second PSPMI for supplying printed material to the mail inserting system which optimizes inserter throughput while maintaining the sort groups.

2. The method of claim 1, wherein the step of obtaining the print file containing representations of the documents sorted into mail sort groups comprises:
    receiving an input print file as the obtained print file,
    wherein the representations of the documents in the received input print file have already been sorted based on the one or more relevant parameters.

3. The method of claim 1, wherein the step of obtaining the print file containing representations of the documents to be sorted into mail sort groups comprises:
    (a) receiving an input print file, representing the plurality of documents to be printed; and
    (b) sorting sets of representations of the documents from the input print file into the mail sort groups based on the one or more relevant parameters, to form the obtained print file containing the sorted document representations.

4. The method of claim 3, wherein the one or more relevant parameters relate to one or more parameters from the group consisting of: destination delivery points defined by a postal authority, parameters identifying documents configured to receive different inserts in one or more of the document processing modules, and different accounts associated with different document groups.

5. The method of claim 1, wherein the allocating and ordering of representations of pages of the sorted document representations to the first and second PSPMIs orders representations of documents within each group allocated to each print stream based on relative sizes of the documents.

6. The method of claim 5, wherein within each respective group of documents allocated to one of the print streams, the representations of the documents within the respective group are arranged from largest to smallest based on document page counts.

7. The method of claim 1, wherein the allocating and ordering of representations of pages of the sorted document representations to the first and second PSPMIs comprises allocating the sort groups between the PSPMIs in such a manner that the resultant printed outputs of the first and second PSPMIs are as nearly the same in length as possible.

8. The method of claim 1, wherein the allocating and ordering of representations of pages of the sorted document representations to the first and second PSPMIs keeps the page count of each print stream even.

9. The method of claim 1, wherein for a representation of a multi-page document from the obtained print file, the allocating and ordering of representations of pages allocates all representations of pages of the multi-page document to a single one of the PSPMIs, to avoid allocating pages of the one document to both the first print stream and the second print stream thereby avoiding splitting of the pages of the one document among the first and second print stream processing modules.

10. The method of claim 1, wherein:
the mail inserting system comprises first and second inserters, and the first and second print stream processing modules are modules of the first and second inserters, respectively; and
the allocating and ordering of representations of pages of the sorted document representations to the first and second PSPMIs optimizes throughput of the first and second inserters while maintaining integrity of the sort groups.

11. A method of optimizing an input file to create an output print control file prior to printing to increase throughput of a mail inserting system, wherein document pages of the output print control file are destined for at least a first print stream processing module (PSPM) and a second PSPM of the mail inserting system, the method comprising steps performed by a processor for:
(a) obtaining an input data file or a print file, representing a plurality of documents to be printed, wherein representations of the documents contained within the obtained print file or input data file are optionally sorted into mail sort groups based on one or more relevant parameters;
(b) based on configurations of the first and second PSPMs and one or more attributes of each document, allocating and ordering representations of pages of the sorted document representations for increasing the throughput of the mail inserting system to an output print control file, wherein:
the representations of documents are allocated into electronic first and second print stream processing module inputs (PSPMI), wherein the first PSPMI is to be processed on the first PSPM, and the second PSPMI is to be processed on the second PSPM, while maintaining the sort groups together within the first and second PSPMIs and taking into consideration the processing configuration of the first and second PSPMs on the mail inserting system,
the representations of documents are allocated to the first PSPMI in a two-wide page configuration and the representations of documents are allocated to the second PSPMI in a two-wide page configuration, while maintaining integrity of the sort groups,
the representations of documents are allocated in the PSPMIs according to a page count for each document representation in the respective PSPMI based on the processing parameters of each PSPM to yield optimal processing throughput for the mail inserting system with both the first and second PSPMs running concurrently, and
allocations within the output print control file enable the first and second PSPMIs to be separated post printing into two separate printed rolls of paper or two separate printed fan folded paper stacks to be processed on the first PSPM or the second PSPM, and
(c) generating the output print control file containing optimized representations of the documents allocated to the first and second PSPMIs, suitable for controlling at least one printer capable of printing the document pages in a four-wide format to produce the printed representation of the first PSPMI and second PSPMI for supplying printed material to the mail inserting system which optimizes inserter throughput while maintaining the sort groups.

12. The method of claim 11, wherein:
the mail inserting system comprises first and second inserters, and the first and second PSPMs are modules of the first and second inserters, respectively.

13. The method of claim 1, wherein:
the mail inserting system comprises first and second inserters, and the first and second PSPMs are modules of the first and second inserters, respectively, and
each PSPMI is divided into PSPMIs where the divided PSPMIs are configured to be processed, post printing, on first and second inserter so as to balance the mail inserting job between the first and second inserters.

14. The method of claim 11, wherein the step of obtaining the print file containing representations of the documents sorted into mail sort groups comprises:
receiving an input print file as the obtained print file, wherein the representations of the documents in the received input print file have already been sorted based on the one or more relevant parameters.

15. The method of claim 11, wherein the step of obtaining the print file containing representations of the documents to be sorted into mail sort groups comprises:
(a) receiving an input print file, representing the plurality of documents to be printed; and
(b) sorting sets of representations of the documents from the input print file into the mail sort groups based on the one or more relevant parameters, to form the obtained print file containing the sorted document representations.

16. The method of claim 15, wherein the one or more relevant parameters relate to one or more parameters from the group consisting of: destination delivery points defined by a postal authority, parameters identifying documents configured to receive different inserts in one or more of the document processing modules, and different accounts associated with different document groups.

17. The method of claim 11, wherein the allocating and ordering of representations of pages of the sorted document representations to the first and second PSPMIs orders representations of documents within each group allocated to each print stream based on relative sizes of the documents.

18. The method of claim 17, wherein within each respective group of documents allocated to one of the print streams, the representations of the documents within the respective group are arranged from largest to smallest based on document page counts.

19. The method of claim 11, wherein the allocating and ordering of representations of pages of the sorted document representations to the first and second PSPMIs comprises allocating the sort groups between the PSPMIs in such a manner that the resultant printed outputs of the first and second PSPMIs are as nearly the same in length as possible.

20. The method of claim 11, wherein the allocating and ordering of representations of pages of the sorted document representations to the first and second PSPMIs keeps the page count of each print stream even.

21. The method of claim 11, wherein for a representation of a multi-page document from the obtained print file, the allocating and ordering of representations of pages allocates all representations of pages of the multi-page document to a single one of the PSPMIs, to avoid allocating pages of the one document to both the first print stream and the second print stream thereby avoiding splitting of the pages of the one document among the first and second print stream processing modules.

22. The method of claim 11, wherein:
the mail inserting system comprises first and second inserters, and the first and second print stream processing modules are modules of the first and second inserters, respectively; and
the allocating and ordering of representations of pages of the sorted document representations to the first and second PSPMIs optimizes throughput of the first and second inserters while maintaining integrity of the sort groups.

23. A mail inserting system, comprising:
at least one inserter; and
a print stream optimizer configured to process on a processor, an input data file or a print file representing documents requiring optimization before generating print stream processing module inputs (PSPMIs) compatible with maintaining sort groups, and with first and second print stream processing modules (PSPMs) to optimize inserter throughput based on configurations of the first and second PSPMs and one or more attributes of each document, to allocate and order representations of pages of document representations sorted into sort groups for increasing throughput of the mail inserting system to an output print control file, wherein:
the representations of documents are allocated into electronic first and second print stream processing module inputs (PSPMI), wherein the first PSPMI is to be processed on the first PSPM, and the second PSPMI is to be processed on the second PSPM, while maintaining the sort groups together within the first and second PSPMIs and taking into consideration the processing configuration of the first and second PSPMs on the inserter,
the representations of documents to be printed with even number of pages wide, are allocated to at least two two-wide configurations of the first and second PSPMI, or the representations of documents to be printed with an odd number of pages wide are allocated to at least one two-wide configuration for the first PSPMI, and representations of documents are allocated to at least a single one-wide configuration in the second PSPMI, while maintaining integrity of the sort groups,
the representations of documents are allocated in the PSPMIs according to a page count for each document representation in the respective PSPMI based on the processing parameters of each PSPM to yield optimal processing throughput for the inserter with both the first and second PSPMs running concurrently, and
allocations within the output print control file enable the first and second PSPMIs to be separated post printing into two separate printed rolls of paper or two separate printed fan folded paper stacks to be processed on the first PSPM or the second PSPM.

24. A method of optimizing an input file to create a print file prior to printing a wide format of three pages wide or greater, to increase throughput of a mail inserting system, wherein representations of document pages are destined for a print stream processing module (PSPM) of an inserter that is matched to a page width of the printer output, the method comprising steps performed by a processor for:
(a) obtaining the input data file or the print file, representing a plurality of documents to be printed, wherein representations of the documents, comprised of one or more pages, contained within the obtained print file or input data file are optionally are sorted into mail sort groups based on one or more relevant parameters;
(b) based on configuration of the PSPM of the inserter and one or more attributes of each document, allocating and ordering representations of pages of the sorted document representations for increasing the throughput of the mail inserting system, to an output print control file, wherein:
the representations of documents are allocated into a print stream processing module inputs (PSPMI), where the PSPMI is destined to be processed on the PSPM while maintaining the sort groups together within the PSPMI,
the representations of documents are allocated to the PSPMI in an at least three-wide or greater page configuration, while maintaining integrity of the sort groups,
the representations of documents are allocated in the PSPMI according to page count for each document in the PSPMI based on the number of pages printed across the paper and a matching page width PSPM to yield optimal processing throughput for the inserter by reducing a number of machine cycles required to accumulate a document; and
generating the output print control file containing optimized representations of the documents allocated to the PSPMI, suitable for controlling at least one printer capable of printing the document pages in a three-wide or greater format to produce the printed representation of the PSPMI for supplying printed material to the inserter which optimizes the inserter throughput while maintaining the sort groups.

* * * * *